(12) United States Patent
Benitez et al.

(10) Patent No.: US 6,847,980 B1
(45) Date of Patent: Jan. 25, 2005

(54) FUNDAMENTAL ENTITY-RELATIONSHIP MODELS FOR THE GENERIC AUDIO VISUAL DATA SIGNAL DESCRIPTION

(76) Inventors: Ana B. Benitez, 400 W. 119th St., Apt. 9F, New York, NY (US) 10027;
Alejandro Jaimes, 349 E. 61st St., Apt. 2B, New York, NY (US) 10021;
Shih-Fu Chang, 560 Riverside Dr., Apt. 18K, New York, NY (US) 10027;
John R. Smith, 275 W. 96th St., Apt. 18K, New York, NY (US) 10025;
Chung-sheng Li, 50 Croton Ave., Apt. 2C, Ossining, NY (US) 10562

(*) Notice: Subject to any disclaimer, the term of this patent is extended or adjusted under 35 U.S.C. 154(b) by 0 days.

(21) Appl. No.: 09/607,974
(22) Filed: Jun. 30, 2000

Related U.S. Application Data
(60) Provisional application No. 60/142,325, filed on Jul. 3, 1999.

(51) Int. Cl.[7] .............................................. G06F 17/30
(52) U.S. Cl. .................................................. 707/104.1
(58) Field of Search .......................... 707/104.1, 500.1, 707/102, 6, 205; 345/328

(56) References Cited

U.S. PATENT DOCUMENTS 6,223,183 B1 * 4/2001 Smith et al. ................ 707/102
6,236,395 B1 * 5/2001 Sezan et al. ................ 345/328
6,360,234 B2 * 3/2002 Jain et al. ................ 707/500.1

* cited by examiner

Primary Examiner—Safet Metjahic
Assistant Examiner—Haythim J Alaubaidi
(74) Attorney, Agent, or Firm—Baker Botts LLP

(57) ABSTRACT

An invention for generating standard description records from multimedia information. The invention utilizes fundamental entity-relation models for the Generic AV DS that classify the entities, the entity attributes, and the relationships in relevant types to describe visual data. It also involves classification of entity attributes into syntactic and semantic attributes. Syntactic attributes can be categorized into different levels: type/technique, global distribution, local structure, and global composition. Semantic attributes can be likewise discretely categorized: generic object, generic scene, specific object, specific scene, abstract object, and abstract scene. The invention further classifies entity relationships into syntactic/semantic categories. Syntactic relationship categories include spatial, temporal, and visual categories. Semantic relationship categories include lexical and predicative categories. Spatial and temporal relationships can be topological or directional; visual relationships can be global, local, or composition; lexical relationships can be synonymy, antonymy, hyponymy/hypernymy, or meronymy/holonymy; and predicative relationships can be actions (events) or states.

16 Claims, 8 Drawing Sheets

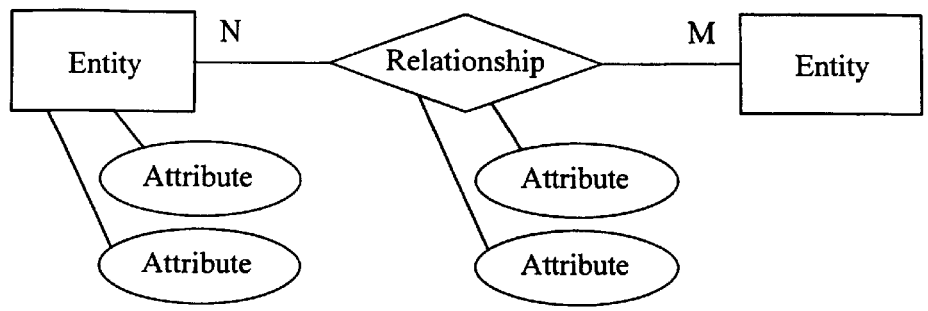
Figure 1: Entity-Relationship (E-R) model.
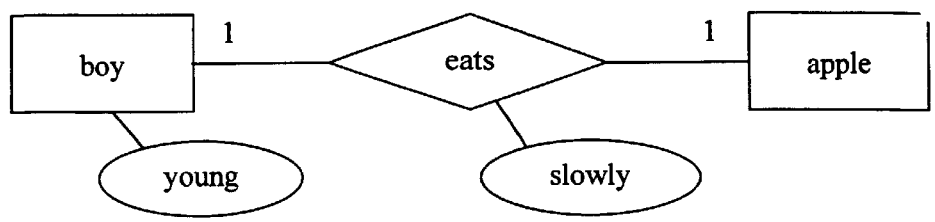
Figure 2: Example of entity-relation model for "A young boy eats an apple in 4 minutes".

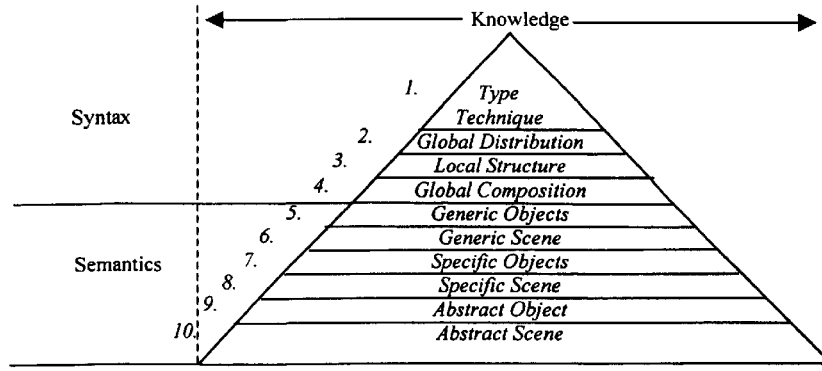

Figure 3: The indexing visual structure is represented by a pyramid. It is clear that the lower the level in the pyramid, the more knowledge and information is required to perform the indexing there. The width of each level is an indication of the amount of knowledge required - for example, more information is needed to name specific objects in the same scene.

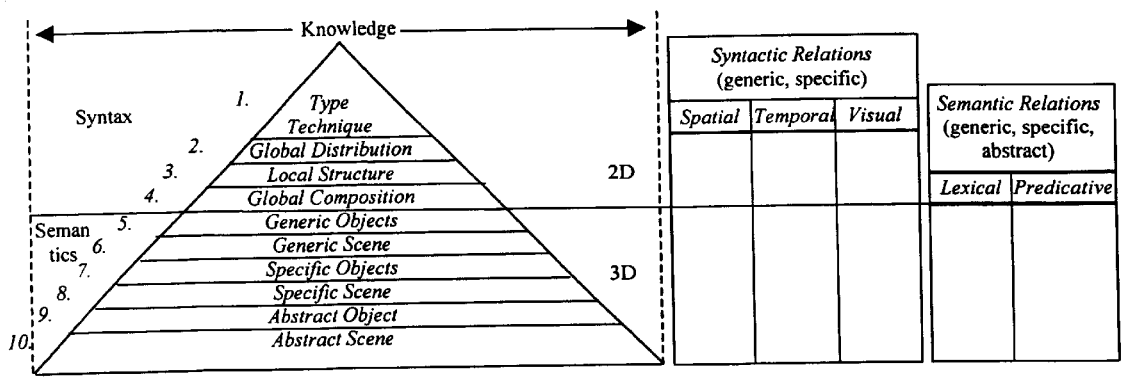

Figure 4: Relationships are proposed at different levels of the visual structure. Elements within the syntactic levels are related according to one types of relationships: syntactic. Elements within the semantic levels are related according to two types of relationships: syntactic and semantics.

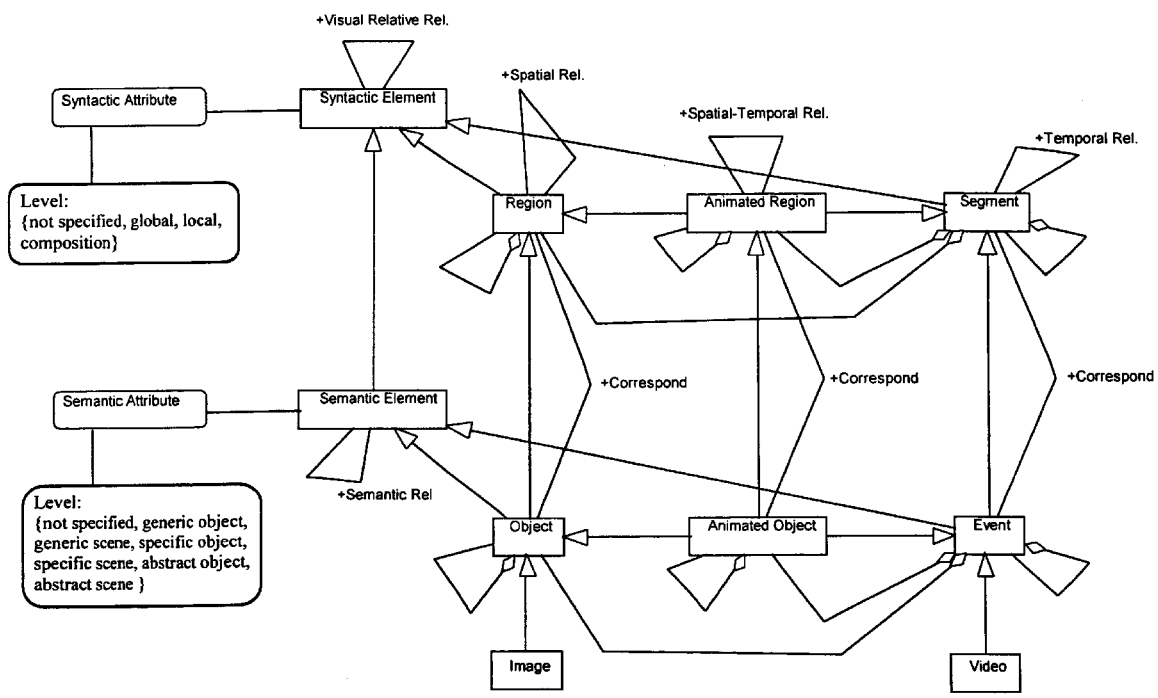

Figure 5: Fundamental models of each propose type of content element. Attributes, elements, and relationships are categorized in the following classes: syntactic and semantic. The semantic and syntactic attributes have an associated attribute, level, whose value correspond to the level of the visual that they refer to. Syntactic elements are further divided in region, segment, and animated regions. Semantic elements are categorized in object, animated object, and event classes.

Figure 6: Baseball batting event.
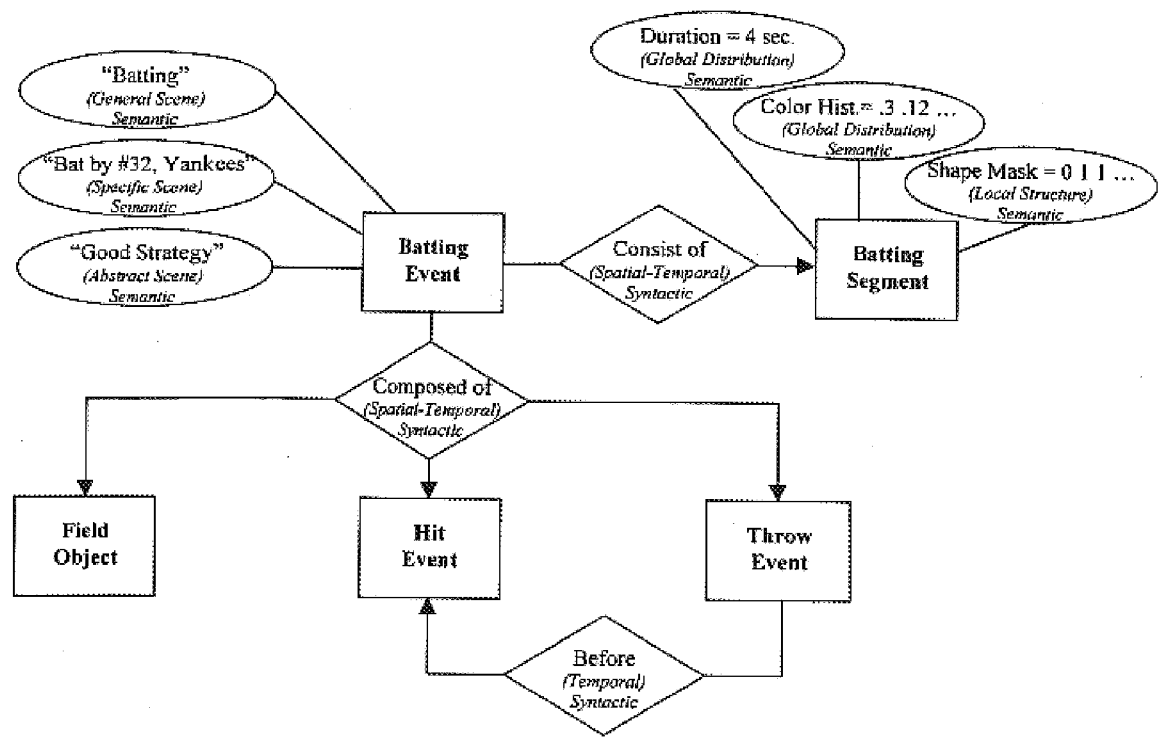
Figure 7: Description of the Batting Event for the Baseball game in Figure 6.

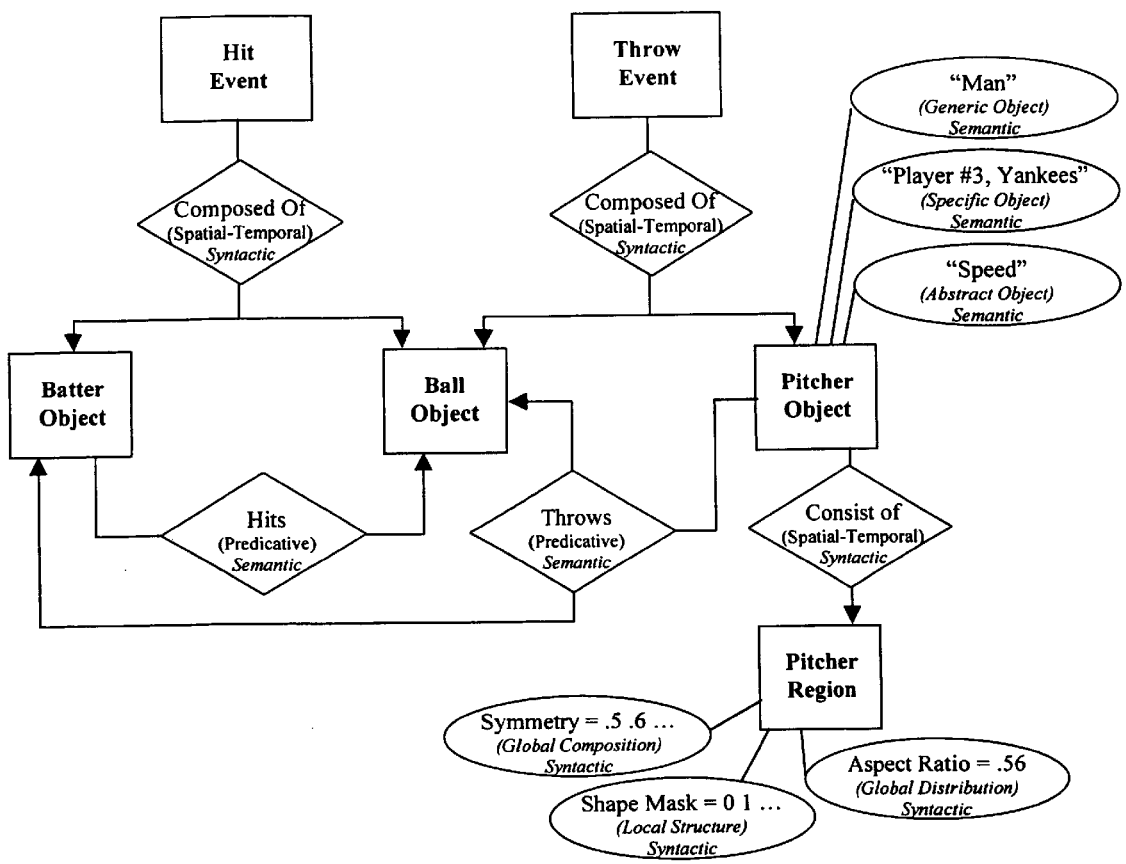
Figure 8: Description of the Hit and the Throw Events for the Batting Event in Figure 6.

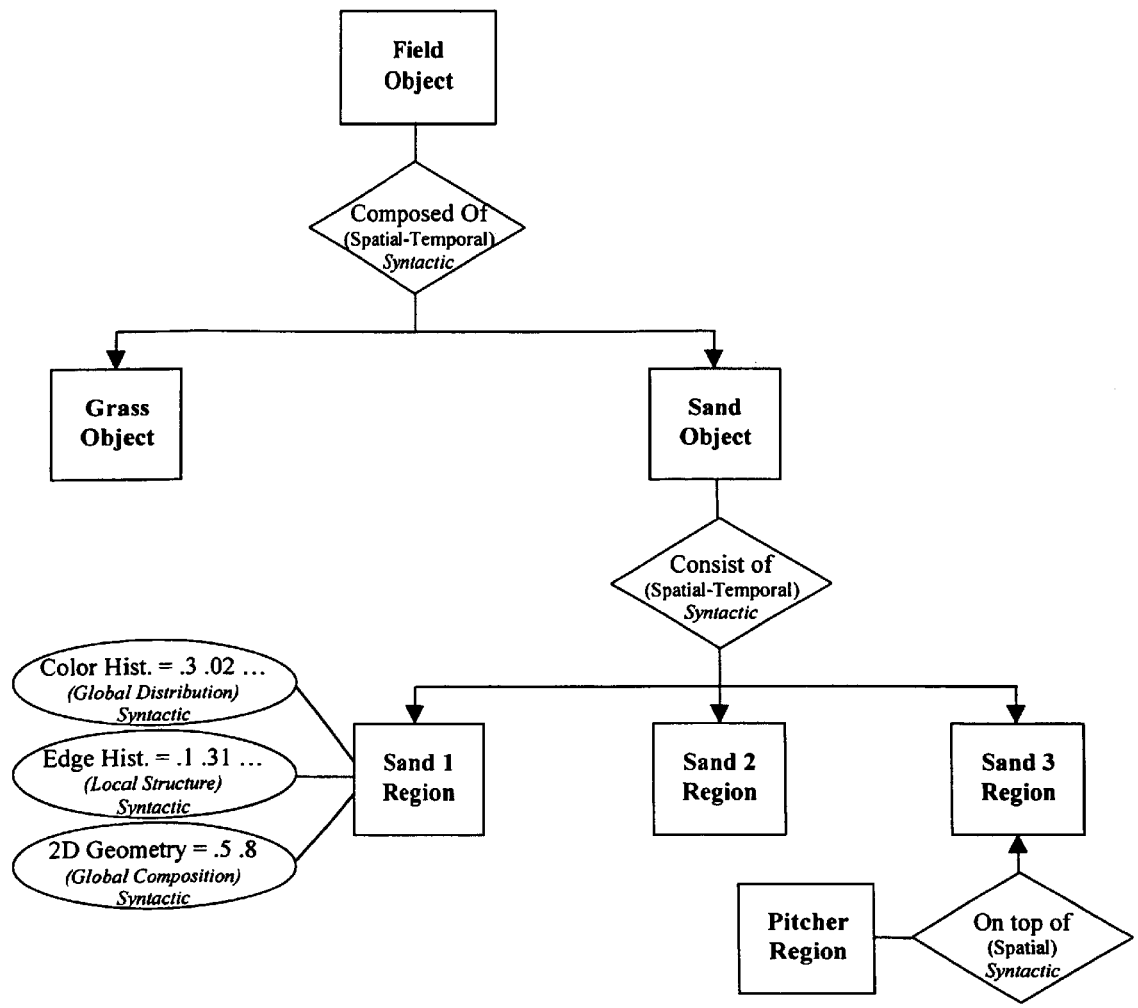
Figure 9: Description of the Field Object for the Batting Event in Figure 6.

*Non-visual* structure

|  | Specific | Generic | Abstract |
| --- | --- | --- | --- |
| Who | B. Clinton, L. Zhaoxing | Men | Intl politics |
| What action | Signing condolence book | Meeting | Apology |
| What object | Condolence book #3 | Book | Condolences |
| Where | Oval office | Indoors | Government |
| When | May 13, 1999 | Daytime | War |
| Why | Bombing | Embassy bombing | Mistake |

FUNDAMENTAL ENTITY-RELATIONSHIP MODELS FOR THE GENERIC AUDIO VISUAL DATA SIGNAL DESCRIPTION

CROSS REFERENCE TO RELATED APPLICATION

The present application is based on U.S. provisional patent application No. 60/142,325, filed Jul. 3, 1999, from which priority is claimed.

BACKGROUND OF THE INVENTION

I. Field of the Invention

The present invention relates to techniques for describing multimedia information, and more specifically, to techniques which describe both video and image information, or audio information, as well as to content of such information. The techniques disclosed are for content-sensitive indexing and classification of digital data signals (e.g., multimedia signals).

II. Description of the Related Art

With the maturation of the global Internet and the widespread employment of regional networks and local networks, digital multimedia information has become increasingly accessible to consumers and businesses. Accordingly, it has become progressively more important to develop systems that process, filter, search and organize digital multimedia information, so that useful information can be culled from this growing mass of raw information.

At the time of filing the instant application, solutions exist that allow consumers/and business to search for textual information. Indeed, numerous text-based search engines, such as those provided by yahoo.com, goto.com, excite.com and others are available on the World Wide Web, and are among the most visited Web sites, indicating the significant of the demand for such information retrieval technology.

Unfortunately, the same is not true for multimedia content, as no generally recognized description of this material exists.

The recent proliferation of digital images and video has brought new opportunities to end-users that now have a large amount of resources when searching for content. Visual information is widely available on diverse topics, from many different sources, and in many different formats. This is an advantage, but at the same time a challenge since users cannot review large quantities of data when searching such content. It is imperative, therefore, to allow users to efficiently browse content or perform queries based on their specific needs. In order to provide such functionalities in a digital library, however, it is essential to understand the data, and index it appropriately. This indexing must be structured and it must be based on how users will want to access such information.

In traditional approaches, textual annotations are used for indexing— a cataloguer manually assigns a set of key words or expressions to describe an image. Users can then perform text-based queries or browse through manually assigned categories. In contrast to text-based approaches, recent techniques in content-based retrieval have focused on indexing images based on their visual content. Users can perform queries by example (e.g., images that look like this one) or user-sketch (e.g., image that looks like this sketch). More recent efforts attempt automatic classification of images based on their content: a system classifies each image, and assigns it a label (e.g., indoor, outdoor, contains a face, etc.).

In both paradigms there are classification issues which are often overlooked, particularly in the content-based retrieval community. The main difficulty in appropriately indexing visual information can be summarized as follows: (I) there is a large amount of information present in a single image (e.g., what to index?), and (2) different levels of description are possible (e.g., how to index?). Consider, for example, a portrait of a man wearing a suit. It would be possible to label the image with the terms "suit" or "man". The term "man", in turn, could carry information at multiple levels: conceptual (e.g., definition of man in the dictionary), physical (size, weight) and visual (hair color, clothing), among others. A category label, then, implies explicit (e.g., the person in the image is a man, not a woman), and implicit or undefined information (e.g., from that term alone it is not possible to know what the man is wearing).

In this regard, there have been past attempts to provide multimedia databases which permit users to search for pictures using characteristics such as color, texture and shape information of video objects embedded in the picture. However, at the closing of the 20th Century, it is not yet possible to perform a general search the Internet or most regional or local networks for multimedia content, as no broadly recognized description of this material exists. Moreover, the need to search for multimedia content is not limited to databases, but extends to other applications, such as digital broadcast television and multimedia telephony.

One industry wide attempt to develop such standard a multimedia description framework has been through the Motion Pictures Expert Group's ("MPEG") MPEG-7 standardization effort. Launched in October 1996, MPEG-7 aims to standardize content descriptions of multimedia data in order to facilitate content-focused applications like multimedia searching, filtering, browsing and summarization. A more complete description of the objectives of the MPEG-7 standard are contained in the International Organisation for Standardisation document ISO/IEC JTC1/SC29/WG11 N2460 (October 1998), the content of which is incorporated by reference herein.

The MPEG-7 standard has the objective of specifying a standard set of descriptors as well as structures (referred to as "description schemes") for the descriptors and their relationships to describe various types of multimedia information. MPEG-7 also proposes to standardize ways to define other descriptors as well as "description schemes" for the descriptors and their relationships. This description, i.e. the combination of descriptors and description schemes, shall be associated with the content itself, to allow fast and efficient searching and filtering for material of a user's interest. MPEG-7 also proposes to standardize a language to specify description schemes, i.e. a Description Definition Language ("DDL"), and the schemes for binary encoding the descriptions of multimedia content.

At the time of filing the instant application, MPEG is soliciting proposals for techniques which will optimally implement the necessary description schemes for future integration into the MPEG-7 standard. In order to provide such optimized description schemes, three different multimedia-application arrangements can be considered. These are the distributed processing scenario, the content-exchange scenario, and the format which permits the personalized viewing of multimedia content.

Regarding distributed processing, a description scheme must provide the ability to interchange descriptions of multimedia material independently of any platform, any vendor, and any application, which will enable the distributed processing of multimedia content. The standardization of interoperable content descriptions will mean that data from a variety of sources can be plugged into a variety of distributed applications, such as multimedia processors, editors, retrieval systems, filtering agents, etc. Some of these applications may be provided by third parties, generating a sub-industry of providers of multimedia tools that can work with the standardized descriptions of the multimedia data.

A user should be permitted to access various content providers' web sites to download content and associated indexing data, obtained by some low-level or high-level processing, and proceed to access several tool providers' web sites to download tools (e.g. Java applets) to manipulate the heterogeneous data descriptions in particular ways, according to the user's personal interests. An example of such a multimedia tool will be a video editor. A MPEG-7 compliant video editor will be able to manipulate and process video content from a variety of sources if the description associated with each video is MPEG-7 compliant. Each video may come with varying degrees of description detail, such as camera motion, scene cuts, annotations, and object segmentations.

A second scenario that will greatly benefit from an interoperable content description standard is the exchange of multimedia content among heterogeneous multimedia databases. MPEG-7 aims to provide the means to express, exchange, translate, and reuse existing descriptions of multimedia material.

Currently, TV broadcasters, Radio broadcasters, and other content providers manage and store an enormous amount of multimedia material. This material is currently described manually using textual information and proprietary databases. Without an interoperable content description, content users need to invest manpower to translate manually the descriptions used by each broadcaster into their own proprietary scheme. Interchange of multimedia content descriptions would be possible if all the content providers embraced the same scheme and content description schemes. This is one of the objectives of MPEG-7.

Finally, multimedia players and viewers that employ the description schemes must provide the users with innovative capabilities such as multiple views of the data configured by the user. The user should be able to change the display's configuration without requiring the data to be downloaded again in a different format from the content broadcaster.

The foregoing examples only hint at the possible uses for richly structured data delivered in a standardized way based on MPEG-7. Unfortunately, no prior art techniques available at present are able to generically satisfy the distributed processing, content-exchange, or personalized viewing scenarios. Specifically, the prior art fails to provide a technique for capturing content embedded in multimedia information based on either generic characteristics or semantic relationships, or to provide a technique for organizing such content. Accordingly, there exists a need in the art for efficient content description schemes for generic multimedia information.

During the MPEG Seoul Meeting (March 1999), a Generic Visual Description Scheme (Video Group, "Generic Visual Description Scheme for MPEG-7", ISO/IEC JTC1/SC29/WG11 MPEG99/N2694, Seoul, Korea, March 1999) was generated following some of the recommendations from the DS1 (still images), DS3++ (multimedia), DS4 (application), and, especially, DS2 (video) teams of the MPEG-7 Evaluation AHG (Lancaster, U.K., February 1999) (AHG on MPEG-7 Evaluation Logistics, "Report of the Ad-hoc Group on MPEG-7 Evaluation Logistics", ISO/IEC JTC1/SC29/WG11 MPEG99/N4524, Seoul, Korea, March 1999). The Generic Visual DS has evolved in the AHG on Description Schemes to the Generic Audio Visual Description Scheme ("AV DS") (AHG on Description Scheme, "Generic Audio Visual Description Scheme for MPEG-7 (V0.3)", ISO/IEC JTC1/SC29/WG11 MPEG99/M4677, Vancouver, Canada, July 1999). The Generic AV DS describes the visual content of video sequences or images and, partially, the content of audio sequences; it does not address multimedia or archive content.

The basic components of the Generic AV DS are the syntactic structure DS, the semantic structure DS, the syntactic-semantic links DS, and the analytic/synthetic model DS. The syntactic structure DS is composed of region trees, segment trees, and segment/region relation graphs. Similarly, the semantic structure DS is composed of object trees, event trees, and object/event relation graphs. The syntactic-semantic links DS provide a mechanism to link the syntactic elements (regions, segments, and segment/region relations) with the semantic elements (objects, events, and event/object relations), and vice versa. The analytic/synthetic model DS specifies the projection/registration/conceptual correspondence between the syntactic and the semantic structure. The semantic and syntactic elements, which we will refer to as content elements in general, have associated attributes. For example, a region is described by color/texture, shape, 2-D geometry, motion, and deformation descriptors. An object is described by type, object-behavior, and semantic annotation DSs.

We have identified possible shortcomings in the current specification of the Generic AV DS. The Generic AV DS includes content elements and entity-relation graphs. The content elements have associated features, and the entity-relation graphs describe general relationships among the content elements. This follows the Entity-Relationship (ER) modeling technique (P. P-S. Chen, "The Entity-Relation Model—Toward a Unified View of Data", ACM Transactions on Database Systems, Vol. 1, No. 1, pp. 9–36, March 1976). The current specification of these elements in the Generic AV DS, however, is too generic to become a useful and powerful tool to describe audio-visual content. The Generic AV DS also includes hierarchies and links between the hierarchies, which is typical of physical hierarchical models. Consequently, the Generic AV DS is a mixture of different conceptual and physical models. Other limitations of this DS may be the rigid separation of the semantic and the syntactic structures and the lack of explicit and unified definitions of its content elements.

The Generic AV DS describes images, video sequences, and, partially, audio sequences following the classical approach for book content descriptions: (1) definition of the physical or syntactic structure of the document; the Table of Contents; (2) definition of the semantic structure, the Index; and (3) definition of the locations where semantic notions appear. It consists of (1) syntactic structure DS; (2) semantic structure DS; (3) syntactic-semantic links DS; (4) analytic/synthetic model DS; (5) visualization DS; (6) meta information DS; and (7) media information DS.

The syntactic DS is used to specify physical structures and the signal properties of an image or a video sequence defining the table of contents of the document. It consists of (1) segment DS; (2) region DS; and (3) segment/region relation graph DS. The segment DS may be used to define trees of segments that specify the linear temporal structure of the video program. Segments are a group of continuous frames in a video sequence with associated features: time DS, meta information DS, media information DS. A special type of segment, a shot, includes editing effect DS, key frame DS, mosaic DS, and camera motion DS. Similarly, the region DS may be used to define a tree of regions. A region is defined as group of connected pixels in a video sequence of an image with associated features: geometry DS, color/texture DS, motion DS, deformation DS, media information DS, and meta information DS. The segment/region relation graph DS specifies general relationships among segments and regions, e.g. spatial relationships such as "To The Left Of"; temporal relationships such as "Sequential To"; and semantic relationships such as "Consist Of".

The semantic DS is used to specify semantic features of an image or a video sequence in terms of semantic objects and events. It can be viewed as a set of indexes. It consists of (1) event DS; (2) object DS; and (3) event/object relation graph DS. The event DS may be used to form trees of events that define a semantic index table for the segments in the segment DS. Events contain an annotation DS. Similarly, the object DS may be used to form trees of objects that define a semantic index table for the objects in the object DS. The event/object relation graph DS specifies general relationships among events and objects.

The syntactic-semantic links DS are bi-directional between the syntactic elements (segments, regions, or segment/region relations) and the semantic elements (events, objects, or event/object relations). The analytic/synthetic model DS specifies the projection/registration/conceptual correspondence between syntactic and semantic structure DSs. The media and meta information DS contains descriptors of the storage media and the author-generated information, respectively. The visualization DS contains a set of view DS to enable efficient visualization of a video program. It includes the following views: multi-resolution space-frequency thumbnail, key-frame, highlight, event, and alternate views. Each one of these views is independently defined.

Shortcomings of Generic AV DS

The Generic AV DS includes content elements (i.e. regions, objects, segments, and events), with associated features. It also includes entity-relation graphs to describe general relationships among content elements following the entity-relationship model. A drawback of the current DS is that the features and the relationships among elements can have a broad range of values, which reduces their usefulness and expressive power. A clear example is the semantic annotation feature in the object element. The value of the semantic annotation could be a generic ("Man"), a specific ("John Doe"), or an abstract ("Happiness") concept.

The initial goal of the development leading to the present invention was to define explicit entity-relationship structures for the Generic AV DS to address this drawback. The explicit entity-relationship structures would categorize the attributes and the relationships into relevant classes. During this process, especially during the generation of concrete examples (see the baseball example shown in FIGS. 6–9), we became aware of other shortcomings of the current Generic AV DS, this time, related to the DS's global design. We shall present these in this section. In this application, we propose complete fundamental entity-relationship models that try to address these issues.

First, the full specification of the Generic DS could be represented using an entity-relationship model. As an example, the entity-relation models provided in FIGS. 7–9 for the baseball example in FIG. 6, include the functionality addressed by most of the components of the Generic AV DS (e.g. the event DS, the segment DS, the object DS, the region DS, the syntactic-semantic links DS, the segment/region relation graph DS, and the event/object relation graph DS) and more. The entity-relationship (E-R) model is a popular high-level conceptual data model, which is independent of the actual implementation as hierarchical, relational, or object-oriented models, among others. The current version of the Generic DS seems to be a mix of multiple conceptual and implementation data models: the entity-relationship model (e.g. segment/region relation graph), the hierarchical model (e.g. region DS, object DS, and syntactic-semantic links DS), and the object-oriented model (e.g. segment DS, visual segment DS, and audio segment DS).

Second, the separation between syntax and semantics in the current Generic DS is too rigid. For the example in FIG. 6, we have separated the descriptions of the Batting Event and the Batting Segment (see FIG. 7), as the current Generic AV DS proposes. In this case, however, it would have been more convenient to merge both elements into a unique Batting Event with semantic and syntactic features. Many groups working on video indexing have advocated the separation of the syntactic structures (Table of Contents: segments and shots) and the semantic structures (Semantic Indexes: events). In describing images or animated objects in video sequences, however, the value of separating these structures is less clear. "Real objects" are usually described by their semantic features (e.g. semantic class—person, cat, etc.) as well as by their syntactic features (e.g. color, texture, and motion). The current Generic AV DS separates the definition of "real objects" in the region and the object DSs, which may cause inefficient handling of the descriptions.

Finally, the content elements, especially the object and the event, lack explicit and unified definitions in the Generic DS. For example, the current Generic DS defines an object as having some semantic meaning and containing other objects. Although objects are defined in the object DS, event/object relation graphs can describe general relationships among objects and events. Furthermore, objects are linked to corresponding regions in the syntactic DS by the syntactic-semantic links DS. Therefore, the object has a distributed definition across many components of the Generic Visual DS, which is less than clear. The definition of an event is very similar and as vague.

Entity-Relationship Models for Generic AV DS

The Entity-Relationship (E-R) model first presented in P. P-S. Chen, "The Entity-Relation Model—Toward a Unified View of Data", ACM Transactions on Database Systems, Vol. 1, No. 1, pp. 9–36, March 1976 describes data in terms of entities and their relationships. Both entities and relationships can be described by attributes. The basic components of the entity-relationship model are shown in FIG. 1. The entity, the entity attribute, the relationship, and the relationship attribute correspond very closely to the noun (e.g. a boy and an apple), the adjective (e.g. young), the verb (e.g. eats), and the verb complement (e.g. slowly), which are essential components for describing general data. "A young boy eats an apple slowly", which could be the description of a video shot, is represented using an entity-relationship model in FIG. 2. This modeling technique has been used to model the contents of pictures and their features for image retrieval.

In this section, we propose fundamental entity-relationship models for the current Generic AV DS to address the shortcomings discussed previously. The fundamental entity-relation models index (1) the attributes of the content elements, (2) the relationships among content elements, and (3) the content elements themselves. These models are depicted in FIG. 5. Our proposal builds on top of the conceptual framework for indexing visual information presented in A. Jaimes and S.-F. Chang, "A Conceptual Framework for Indexing Visual Information at Multiple Levels", Submitted to Internet Imaging 2000.

SUMMARY OF THE INVENTION

An object of the present invention is to provide content description schemes for generic multimedia information.

Another object of the present invention is to provide techniques for implementing standardized multimedia content description schemes.

A further object of the present invention is to provide an apparatus which permits users to perform enhanced content-sensitive general searches on the Internet or regional or local networks for multimedia content.

Still another object of the present invention is to provide systems and techniques for capturing content embedded in multimedia information based on either generic characteristics or semantic relationships.

Still a further object of the present invention is to provide a technique for organizing content embedded in multimedia information based on distinction of entity attributes into syntactic and semantic. Syntactic attributes can be categorized into different levels: type/technique, global distribution, local structure, and global composition. Semantic attributes can be categorized into different levels: generic object, generic scene, specific object, specific scene, abstract object, and abstract scene.

Yet a further object of the present invention is classification of entity relationships into syntactic and semantic categories. Syntactic relationships can be categorized into spatial, temporal, and audio categories. Semantic relationships can be categorized into lexical and predicative categories. Spatial and temporal relationships can be topological or directional; audio relationships can be global, local, or composition; lexical relationships can be synonymy, antonymy, hyponymy/hypernymy, or meronymy/holonymy; and predicative relationships can be actions (events) or states.

A further object of the present invention is to describe each level, and entity relationships, in terms of video and audio signal classification.

Another object of the present invention is to provide fundamental and explicit entity-relationship models to address these issues by indexing the content-element attributes, the relationships among content elements, and the content elements themselves.

This work is based on the conceptual framework for indexing visual information presented in A. Jaimes and S.-F. Chang, "A Conceptual Framework for Indexing Visual Information at Multiple Levels", Submitted to Internet Imaging 2000, which has been adapted and extended for the Generic AV DS. The work in other references (e.g., S. Paek, A. B. Benitez, S.-F. Chang, C.-S. Li, J. R. Smith, L. D. Bergman, A. Puri, C. Swain, and J. Ostermann, "Proposal for MPEG-7 image description scheme", Proposal to ISO/IEC JTC1/SC29/WG11 MPEG99/P480, Lancaster, U.K., February 1999) is relevant because it separates the description of the content elements (objects) and the specification of relationships among the content elements (with entity-relation graphs and hierarchies, a particular case of entity-relation graph). By doing so, it is clearly specifying an E-R Model.

We focus on the problem of multiple levels of description for indexing visual information. We present a novel conceptual framework, which unifies concepts from the literature in diverse fields such as cognitive psychology, library sciences, art, and the more recent content-based retrieval. We make distinctions between visual and non-visual information and provide the appropriate structures. The ten-level visual structure presented provides a systematic way of indexing images based on syntax (e.g., color, texture, etc.) and semantics (e.g., objects, events, etc.), and includes distinctions between general concept and visual concept. We define different types of relations (e.g., syntactic, semantic) at different levels of the visual structure, and also use a semantic information table to summarize important aspects related to an image (e.g., that appear in the non-visual structure).

Our structures place state-of-the art content-based retrieval techniques in perspective, relating them to real user-needs and research in other fields. Using structures such as the ones presented, is beneficial not only in terms of understanding the users and their interests, but also in characterizing the content-based retrieval problem according to the levels of descriptions used to access visual information.

The present invention proposes to index the attributes of the content elements based on the ten-level conceptual structure presented in A. Jaimes and S.-F. Chang, "A Conceptual Framework for Indexing Visual Information at Multiple Levels", Submitted to Internet Imaging 2000, which distinguishes the attributes based on syntax (e.g. color and texture) and semantics (e.g. semantic annotations) as shown in FIG. 3. The first four levels of the visual structure refer to syntax, and the remaining six refer to semantics. The syntax levels are type/technique, global distribution, local structure, and global composition. The semantic levels are generic object, generic scene, specific object, specific scene, abstract object, and abstract scene.

We also propose explicit types of relationships among content elements in the entity-relation graphs of the Generic AV DS. We distinguish between syntactic and semantic relationships as shown in FIG. 4. Syntactic relationships are divided into spatial, temporal, and visual. Spatial and temporal attributes are classified into topological and directional classes. Syntactic-attribute relationships can be further indexed into global, local, and composition. Semantic relationships are divided into lexical and predicative. Lexical relationships are classified into synonymy, antonymy, hyponymy/hypernymy, and meronymy/holonymy. Predicative relationships can be further indexed into action and event.

In term of types of content elements, we propose to classify them into syntactic and semantic elements. Syntactic elements can be divided into region, animated-regions, and segment elements; semantic elements can be indexed in object, animated-object, and event elements. We provide explicit and unified definitions of these elements that are represented in the proposed fundamental models in term of their attributes and the relationships with other elements. Inheritance relationships among some of these elements are also specified.

The accompanying drawings, which are incorporated and constitute part of this disclosure, illustrate preferred embodiments of the invention and serve to explain the principles of the invention.

BRIEF DESCRIPTION OF THE DRAWINGS

FIG. 1 is a generic Entity-Relationship (E-R) model;

FIG. 2 provides an example of an entity-relation model for the scenario "A young boy eats an apple in 4 minutes";

FIG. 3 represents the indexing visual structure by a pyramid;

FIG. 4 shows relationships as proposed at different levels of the visual structure;

FIG. 5 sets forth fundamental models of each proposed type of content element;

FIG. 6 pictorially displays a baseball batting event image;

FIG. 7 is a conceptual description of the Batting Event for the Baseball batting event image displayed in FIG. 6;

FIG. 8 is a conceptual description of the Hit and the Throw Events for the Batting Event of FIG. 6;

FIG. 9 is a conceptual description of the Field Object for the Batting Event of FIG. 6;

DESCRIPTION OF THE PREFERRED EMBODIMENTS

Figure 10:
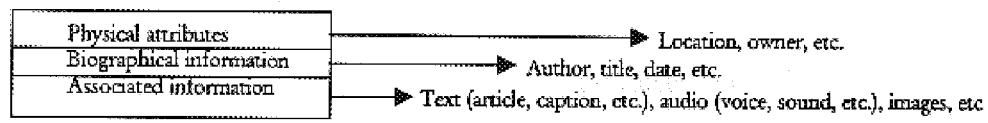
FIG. 10 conceptually represents analysis of non-visual information.

We choose the modeling technique used herein because entity-relationship models are the most widely used conceptual models. They provide a high degree of abstraction and are hardware and software independent. There exits specific procedures to transform these models into physical models for implementation, which are hardware and software dependent. Examples of physical models are the hierarchical model, the relational model, and the object-oriented model. The E-R conceptual framework in the context of MPEG-7 is discussed in J. R. Smith and C.-S. Li, ""An E-R Conceptual Modeling Framework for MPEG-7"", Contribution to ISO/IEC JTC1/SC29/WG11 MPEG99, Vancouver, Canada, July 1999.

As shown in FIG. 5, we make the distinction between syntax and semantics for attributes (or MPEG-7 descriptors), relationships, and content elements. Syntax refers to the way the content elements are arranged without considering the meaning of such arrangements. Semantics, on the other hand, deals with the meaning of those elements and of their arrangements. As will be discussed in the remainder of the section, syntactic and semantic attributes can refer to several levels (the syntactic levels are type, global distribution, local structure, and global composition; the semantic levels are generic object/scene, specific object/scene, and abstract object/scene; see FIG. 3. Similarly, syntactic and semantic relationships can be further divided into sub-types referring to different levels (syntactic relationships are categorized into spatial, temporal, and visual relationships at generic and specific levels; semantic relationships are categorized into lexical and predicative; see FIG. 4. We provide compact and clear definitions of the syntactic and semantic elements based on their associated types of attributes and relationships with other elements. An important difference with the Generic AV DS, however, is that our semantic elements include not only semantic attributes but also syntactic attributes. Therefore, if an application would rather not distinguish between syntactic and semantic elements, it can do so by implementing all the elements as semantic elements.

To clarify the explanation of the fundamental entity-relationships models, we will use the examples in FIGS. 6–9, FIG. 6 shows a video shot of a baseball game representing as a Batting Event and a Batting Segment (segment and event as defined in the Generic AV DS). FIG. 7 includes a possible description of the Batting Event as composed of a Field Object, a Hit Event, a Throw Event, a temporal relationship "Before" between the Throw and the Hit Events, and some visual attributes. FIG. 8 presents descriptions of the Throw and the Hit Events and relationships among them. The Throw Event is the action that the Pitcher Object executes over a Ball Object towards the Batter Object, "Throws". We provide some semantic attributes for the Pitcher Object. The Hit Event is the action that the Batter Object executes over the same Ball Object, "Hit". FIG. 9 shows the decomposition of the Field Object into three different regions, one of which is related to the Pitcher Object by the spatial relationships "On top of". Some visual attributes for one of these regions are provided.

Types of Attributes

We propose a ten-level conceptual structure to index the visual content elements (e.g. regions, entire images, and events) in image and video descriptions. This structure is valid only for the information explicitly depicted in the actual image or the video sequence (e.g., the price of a painting would not be part of visual content).

The proposed visual structure contains ten levels: the first four refer to syntax, and the remaining six refer to semantics. An overview of the visual structure is given in FIG. 3. The lower the level is in the pyramid, the more knowledge and information is required to perform indexing. The width of each level is an indication of the amount of knowledge required there. The indexing cost of an attribute can be included as a sub-attribute of the attribute. The syntax levels are type/technique, global distribution, local structure, and global composition. The semantic levels are generic object, generic scene, specific object, specific scene, abstract object, and abstract scene. While some of these divisions may not be strict, they should be considered because they have a direct impact in understanding what the user is searching for and how he tries to find it in a database. They also emphasize the limitations of different indexing techniques (manual and automatic) in terms of the knowledge required.

In FIG. 3, the indexing visual structure is represented by a pyramid. It is clear that the lower the level in the pyramid, the more knowledge and information is required to perform the indexing there. The width of each level is an indication of the amount of knowledge required—for example, more information is needed to name specific objects in the same scene.

In FIG. 5, the syntactic attribute (syntactic Ds) includes an enumerated attribute, level, whose value is its corresponding syntactic level in the visual structure (FIG. 3)—i.e. type, global distribution, local structure, or global composition—or "not specified". The semantic attributes also include an enumerated attribute, level, whose value is its corresponding semantic level in the semantic structure (FIG. 3)—i.e. generic object, generic scene, specific object, specific scene, abstract object, and abstract scene—or "not specified". Another possibility of modeling the different types of syntactic and semantic attributes would be to subclass the syntactic and the semantic attribute elements to create type, global distribution, local structure, and global composition syntactic attributes; or generic object, generic scene, specific object, specific scene, abstract object, abstract scene attributes (some of these types do not apply for all object, animated object, and event), respectively.

Each level of the visual structure is explained below. A discussion of the relationships between levels appears thereafter. Based on this visual structure and the relationships between levels, we define types of content elements in the following section.

Type/Technique

At the most basic level, we are interested in the general visual characteristics of the image or the video sequence. Descriptions of the type of image or video sequence or the technique used to produce it are very general, but prove to be of great importance when organizing a visual database. Images, for example, may be placed in categories such as painting, black and white (b&w), color photograph, and drawing. Related classification schemes at this level have been done automatically in WebSEEk. The type for the example in FIG. 6 is color video sequence.

Global Distribution

The type/technique in the previous level gives general information about the visual characteristics of the image or the video sequence, but gives little information about the visual content. Global distribution aims to classify images or video sequences based on their global content and is measured in terms of low-level perceptual features such as spectral sensitivity (color), and frequency sensitivity (texture). Individual components of the content have not been processed at this level (i.e., no "form" is given to these distributions in the sense that the measures are taken globally), so global distribution features may include global color (e.g., dominant color, average, histogram), global texture (e.g., coarseness, directionality, contrast), global shape (e.g. aspect ratio), global motion (e.g. speed and acceleration), camera motion, global deformation (e.g. growing speed), and temporal/spatial dimensions (e.g. spatial area and temporal dimension). For the Batting Segment in FIG. 6, the color histogram and the time duration, which are global distribution attributes, are specified (see FIG. 7).

Even though some of these measures are difficult to quantify for a human observer, these global low-level features have been successfully used in various content-based retrieval systems to organize the contents of a database for browsing and to perform query by example.

Local Structure

In processing the information of an image or video sequence, we perform different levels of grouping. In contrast to Global Structure, which does not provide any information about the individual parts of the image or the video sequence, the Local Structure level is concerned with the extraction and characterization of the components. At the most basic level, those components result from low-level processing and include elements such as the Dot, Line, Tone, Color, and Texture. As an example, a binary shape mask describes the Batting Segment in FIG. 6 (see FIG. 7). Other examples of local structure attributes are temporal/spatial position (e.g. start time and centroid), local color (e.g. M×N Layout), local motion, local deformation, local shape/2D geometry (e.g. bounding box).

Such elements have also been used in content-based retrieval systems, mainly on query by user-sketch interfaces such as VisualSEEk. The concern here is not with objects, but rather with the basic elements that represent them and with combinations of such elements—a square, for example, is formed by four lines.

Global Composition

At this level, we focus on the specific arrangement or composition of the basic elements given by the local structure. In other words, we analyze the image as a whole, but only use the basic elements described in the previous level (e.g. line and circle) for the analysis. Global Composition refers to the arrangement or spatial layout of elements in the image. Traditional analysis in art describes composition concepts such as balance, symmetry, center of interest (center of attention or focus), leading line, and viewing angle. At this level, however, there is no knowledge of specific objects; only basic elements (e.g. dot, line, and circle.) or groups of basic elements are considered. The 2D geometry of the Sand 1 Region in FIG. 6 is a global composition attribute (see FIG. 9).

Generic Objects Up to the previous level, no world knowledge is required to perform indexing, so automatic techniques can be used to extract relevant information on these levels. Several studies, however, have demonstrated that humans mainly use higher level attributes to describe, classify and search for visual material. C. Jorgensen, "Image Attributes in Describing Tasks: an Investigation", Information Processing & Management, 34, (2/3), pp. 161–174, 1998. C. Jorgensen, "Retrieving the Unretrievable: Art, Aesthetics, and Emotion in Image Retrieval Systems", SPIE Conference in Human Vision and Electronic Imaging, IS&T/SPIE99, Vol. 3644, San Jose, Calif., January 1999. Objects are of particular interest, but they can also be placed in categories at different levels—an apple can be classified as a Macintosh apple, as an apple, or as a fruit. When referring to Generic Objects, we are interested in the basic level categories: the most general level of object description, which can be recognized with everyday knowledge. For the Pitcher Object in FIG. 6, a generic-object attribute could be the annotation "Man" (see FIG. 8).

Generic Scene

Just like an image or a video sequence can be indexed according to the individual objects that appear in it, it is possible to index the visual material as a whole based on the set of all of the objects it contains and their arrangement. Examples of scene classes include city, landscape, indoor, outdoor, still life, and portrait. The guideline for this level is that only general knowledge is required. It is not necessary to know a specific street or building name in order to determine that it is a city scene, nor is it necessary to know the name of an individual to know that the image is a portrait. For the Batting Event in FIG. 6, a generic-scene attribute with value "Batting" is specified (see FIG. 7).

Specific Objects

In contrast to the previous level, Specific Objects refer to identified and named objects. Specific knowledge of the objects in the image or the video sequence is required, and such knowledge is usually objective since it relies on known facts. Examples include individual persons (e.g., the semantic annotation "Peter Who, Player #3 of the Yankees" in FIG. 6) or objects (e.g. the stadium name)

Specific Scene

This level is analogous to Generic Scene with the difference that here there is specific knowledge about the scene. While different objects in the visual material may contribute in different ways to determine the specific scene depicted, a single object is sometimes enough. A picture that clearly shows the White House, for example, can be classified as a scene of the White House, based only on that object. For the Batting Event in FIG. 7, a specific-scene attribute with value is "Bat by player #32 Yankees" is specified.

Abstract Objects

At this level, specialized knowledge about what the objects represent is used. This indexing level is the most difficult one in the sense that it is completely subjective and assessments between different users may vary greatly. The importance of this level was shown in experiments where viewers used abstract attributes to describe images. For example, a woman in a picture may represent anger by one observer and pensiveness to another. For the Pitcher Object in FIG. 8, an abstract-scene attribute with value "Speed" is specified.

Abstract Scene

The Abstract Scene level refers to what the image as a whole represents. It may be very subjective. Users sometimes describe images in abstract terms such as sadness, happiness, power, heaven, and paradise, as for objects. For the Batting Event in FIG. 7, an abstract-scene attribute with value "Good strategy" is specified.

Types of Relationships

In this section, we present the explicit types of relationships between content elements that we propose to be included in the Generic AV DS. As shown in FIG. 4, relationships are defined at the different levels of the visual structure presented earlier. To represent relationships among content elements, we consider the division into syntax and semantics in the visual structure. Some of the limits among the relationship types that we propose are not rigid, as for the level of the visual structure discussed below.

Relationships at the syntactic levels of the visual structure can only occur in 2D space because there is no knowledge of objects at these levels to determine 3D relationships. At the syntactic levels, there can only be syntactic relationships, i.e. spatial (e.g. "Next to"), temporal (e.g. "In parallel"), and visual (e.g. "Darker than") relationships, which are based uniquely based on syntactic knowledge. Spatial and temporal attributes are classified in topological and directional classes. Visual relationships can be further indexed into global, local, and composition.

At the semantic levels of the visual structure, relationships among content elements could occur in 3D. As shown in FIG. 4, elements within these levels could be associated with not only semantic relationships but also syntactic relationships (e.g. "One person is next to another person", and "One person is a friend of another person"). We distinguish between two different types of semantic relationships: lexical relationships such as synonymy, antonymy, hyponymy/hypernymy, and meronymy/holonymy; and predicative relationships referring to actions (events) or states.

In FIG. 4, relationships are proposed at different levels of the visual structure. Elements within the syntactic levels are related according to one types of relationships: syntactic. Elements within the semantic levels are related according to two types of relationships: syntactic and semantics. We shall explain more extensively the syntactic and the semantic relationships with examples in sections below. Tables 1 and 2 summarize the indexing structures for the relationships including examples.

Syntactic Relationships

We divide the syntactic relationships into three classes: spatial, temporal, and visual. One could argue that the spatial and the temporal relationships are just special cases of visual relationships. We define spatial and temporal relationships in a special way. For these relationships, we consider the elements as boundaries in space or time with no information about size or duration, respectively. See Table 1 for a summary of the proposed types of syntactic relationships and examples.

Following the work in D. Hernandez, "Qualitative Representation of Spatial Knowledge", Lecture Notes in Artificial Intelligence, 804, Springer-Verlag, Berlin, 1994, we divide the spatial relationships into the following classes: (1) topological, i.e. how boundaries of elements relate; and (2) orientation or directional, i.e. where the elements are placed relative to each other (see Table 1). Examples of topological relationships are "To be near to", "To be within", and "To be adjacent to"; examples of directional relationships are "To be in front of", "To be to the left of", and "To be on top of".

Well-known spatial relationship graphs are 2D String, $R^2$, and Attributed-Relational Graphs.

In a similar fashion, we classify the temporal relationships into topological and directional classes (see Table 1). Examples of temporal topological relationships are "To happen in parallel", "To overlap", and "To happen within"; examples of directional temporal relationships are "To happen before", and "To happen after". The parallel and sequential relationships of SMIL (World Wide Web Consortium, SMIL web site http://www.w3.org/AudioVideo/#SMIL) are examples of temporal topological relationships.

Visual relationships relate elements based on their visual attributes or features. These relationships can be indexed into global, local, and composition classes (see Table 1). For example, a visual global relationship could be "To be smother than" (based on a global texture feature), a visual local relationship could be "To accelerate faster" (based on a motion feature), and a visual composition relationship could be "To be more symmetric than" (based on a 2D geometry feature). Visual relationships can be used to cluster video shot/key frames based on any combination of visual features: color, texture, 2D geometry, time, motion, deformation, and camera motion.

TABLE 1

Indexing structure for syntactic relationships and examples.

| Types of relationships | | | Levels | Examples |
|---|---|---|---|---|
| Syntactic | Spatial | Topological | Generic | § Near from, Far from, Adjacent to, Contained in, Composed of; Consist of |
| | | | Specific | § The union, The intersection, The negation<br>§ 0.5 inches from, the intersection of two regions<br>§ R in Rθ |
| | | Directional | Generic | § Left of, Top of, Upper left of, Lower right of. Behind<br>§ 2D String |
| | | | Specific | § The union, The intersection, The negation<br>§ 20 degrees north from, 40 degrees east from, the union of two segments<br>§ θ in Rθ |
| | Temporal | Topological | Generic | § Co-begin, Parallel, Sequential, Overlap, Adjacent, Within, Composed, Consist of<br>§ SMIL's <seq> and <par> |
| | | | Specific | § 20 min. apart from, 20 sec. Overlapping<br>§ SMIL's <seq> and <par> with attributes (start time, end time, duration) |
| | | Directional | Generic | § Before, After |
| | | | Specific | § 20 min. after |
| | Visual | Global | Generic | § Smother than, Darker than, More yellow than, Similar texture, Similar Color, Similar speed |
| | | | Specific | § Distance in texture feature, Distance in color histogram<br>§ Indexing hierarchy based on color histogram |
| | | Local | Generic | § Faster than, To grow slower than, Similar speed, Similar shape |
| | | | Specific | § 20 miles/hour faster than, Grow 4 inches/sec. faster than |

TABLE 1-continued

Indexing structure for syntactic relationships and examples.

| Types of relationships | | Levels | Examples |
|---|---|---|---|
| | | | § Indexing hierarchy based on local motion, deformation features |
| Composition | Generic | | § More symmetric than, |
| | Specific | | § Distance in symmetry feature |
| | | | § Indexing hierarchy based on symmetry feature |

In a similar way in which the elements of the visual structure have different levels (generic, specific, and abstract), these types of syntactic relationships (see Table 1) can be defined in a generic level ("Near") or a specific level ("0.5 feet from"). For example, operational relationships such "To be the union of", "To be he intersection of", and "To be the negation of" are topological, specific relationships either spatial or temporal (see Table 1).

Continuing the baseball game example, FIG. 7 shows how the Batting Event is defined by its composing elements (i.e. the Batting Segment, the Field Object, the Hit Event, and the Throw Event), and the relationships among them (i.e. Temporal relationship "Before" from Hit Event to Throw Event). The Batting Event and its composing elements are associated by a spatial-temporal relationship "Composed of".

Semantic Relationships

Semantic relationships can only occur among content elements at the semantic levels of the ten-level conceptual structure. We divide the semantic relationships into lexical semantic and predicative relationships. Table 2 summarizes the semantic relationships including examples.

TABLE 2

Indexing structure for semantic relationships and examples.

| Types of attributes | | | Levels | Examples |
|---|---|---|---|---|
| Semantic | Lexical | Synonymy To be Similar to | Generic | That apple is like that orange |
| | | | Specific | That apple has as many calories as that orange |
| | | | Abstract | That apple is as nutritious as that orange |
| | | Antonymy To be opposite to | Generic | That man is different from that woman |
| | | | Specific | That man is 20-pound heavier than that woman |
| | | | Abstract | That man is uglier than that woman |
| | | Hyponymy Hypernymy To be a - To be a type of | Generic | A dog is an animal |
| | | | Specific | A dog is a mammal animal |
| | | | Abstract | A dog is a playful animal |
| | | Meronymy Holonymy | Generic | Peter is a member of a team |

TABLE 2-continued

Indexing structure for semantic relationships and examples.

| Types of attributes | | | Levels | Examples |
|---|---|---|---|---|
| | | To be a part/member of - To be the whole of | | |
| | | | Specific | Peter is an outfielder for the Yankees |
| | | | Abstract | Peter is the best outfielder in the Yankees' history |
| | Predicative | Action/Event | Generic | The boys are playing with the girls |
| | | | Specific | The boys are playing soccer with the girls |
| | | | Abstract | The boys are playing soccer well with the girls |
| | | State | Generic | The girl owns stock from that company |
| | | | Specific | The girl owns 80% of the stock from the company |
| | | | Abstract | The girl controls the company |

The lexical semantic relationships correspond to the semantic relationships among nouns used in WordNet. These relationships are synonymy (pipe is similar to tube), antonymy (happy is opposite to sad), hyponymy (a dog is an animal), hypernymy (an animal and a dog), meronymy (a musician is member of a musical band), and holonymy (a musical band is composed of musicians).

The predicative semantic attributes refer to actions (events) or states among two ore more elements. Examples of action relationships are "To throw" and "To hit". Examples of state relationships are "To belong" and "To own". FIG. 8 includes two action relationships: "Throw" and "Hit". Instead of only dividing the predicative semantic into actions or states, we could use the partial relational semantic decomposition used in WordNet. WordNet divides verbs into fifteen (15) semantic domains: verbs of bodily care and functions, change, cognition, communication, competition, consumption, contact, creation, emotion, motion, perception, possession, social interaction, and weather verbs. Only those domains that are relevant for the description of visual concept could be used.

As for the ten-level visual structure presented herein, we can define semantic relationships at different levels: generic, specific, and abstract. For example, a generic action relationship is "To own stock", a specific action relationship is "To own 80% of the stock", and, finally, an abstract semantic relationships is "To control the company".

For the Throwing and the Hitting Events in FIG. 6, FIG. 8 shows the use of semantic relationships to describe the actions of two objects: the Pitcher Object "Throws" the Ball Object at the Batter Object and the Batter Object "Hits" the Ball Object.

Types of Entities

Up to this point, we have proposed explicit types of attributes and relationships among content elements. In this section, we propose new types of content elements (the entities of the fundamental E-R models) and provide explicit and unified definitions of each content-element type.

We define types of content elements based on (1) the attributes that describe them and (2) the relationships that associate them to other content elements. Previously, we indexed the visual attributes of the content elements in a ten-level visual structure. The first four levels of the pyramid correspond to syntax, and the other six levels to semantics. Further, we divided the relationships into two classes: syntactic and semantic. Consequently, we propose two basic types of content elements: syntactic and semantic elements (see FIG. 5). Syntactic elements can have only syntactic attributes and relationships (e.g. a color histogram attribute and spatial relationship "On top of"); semantic elements can have not only semantic attributes and relationships but also syntactic attributes and relationships (e.g. an object can be described by a color histogram and a semantic annotation descriptors). Our approach differs from the current Generic AV DS in that our semantic (or high-level) elements include syntactic and semantic information solving the rigid separation of the syntactic and the semantic structures.

As shown in FIG. 5, we further classify the syntactic elements into region, animated region, and segment elements. In a similar way, the semantic elements are classified into the following semantic classes: object, animated object, and event. Region and object are spatial entities. Segment and event are temporal entities. Finally, animated-region and animated-object are hybrid spatial-temporal entities. We explain each type in section accordingly.

Syntactic Entities

The syntactic element is a content element in image or video data that is described only by syntactic attributes, i.e. type, global distribution, local structure, or global composition attributes (see FIG. 5). Syntactic elements can only be related to other elements by visual relationships. We further categorize the syntactic elements into region, animated-region, and segment elements. These elements are derived from the syntactic element through inheritance relationships.

The region element is a pure spatial entity that refers to an arbitrary, continuous or discontinuous section of an image or a video frame. A region is defined by a set of syntactic attributes, and a graph of regions that are related by spatial and visual relationships (see FIG. 5). It is important to point out that the composition relation is of type spatial, topological. Possible attributes of regions are color, texture, and 2D geometry.

The segment element is a pure temporal entity that refers to an arbitrary set of contiguous or not contiguous frames of a video sequence. A segment is defined by a set of syntactic features, and a graph of segments, animated regions, and regions that are related by temporal and visual relationships (see FIG. 5). The composition relation is of type temporal, topological. Possible attributes of segments are camera motion, and the syntactic features. For example, the Batting Segment in FIG. 7 is a segment element that is described by a temporal duration (global distribution, syntactic), and shape mask (local structure, syntactic) attributes. This segment has a "Consist of" relationship with the Batting Event (spatial-temporal relationship, syntactic).

The animated-region element is a hybrid spatial-temporal entity that refers to an arbitrary section of an arbitrary set frames of a video sequence. An animated region is defined by a set of syntactic features, a graph of animated regions and regions that are related by composition, spatial-temporal relationships, and visual relationships (see FIG. 5). Animated regions may contain any features from the region and the segment element. The animated region is a segment and a region at the same time. For example, the Pitcher Region in FIG. 8 is an animated region that is described by an aspect ratio (global distribution, syntactic), a shape mask (local structure, syntactic), and a symmetry (global composition, syntactic) attributes. This animated region is "On top of" the Sand 3 Region (spatial-temporal relationship, syntactic).

Semantic Entities

The semantic element is a content element that is described by not only semantic features but also by syntactic features. Semantic elements can be related to other elements by semantic and visual relationships (see FIG. 5). Therefore, we derive the semantic element from the syntactic element using inheritance. We further categorize the semantic elements into object, animated-object, and event elements. Pure semantic attributes are annotations, which are usually in text format (e.g. 6-W semantic annotations, free text annotations).

The object element is a semantic and spatial entity; its refers to an arbitrary section of an image or a frame of a video. An object is defined by a set of syntactic and semantic features, and a graph of objects and regions that are related by spatial (composition is a spatial relationship), visual, and semantic relationships (see FIG. 5). The object is a region. The event element is a semantic and temporal entity; its refers to an arbitrary section of a video sequence. An event is defined by a set of syntactic and semantic features, and a graph of events, segments, animated regions, animated objects, regions, and objects that are related by temporal (composition is a temporal relationship), visual, and semantic relationships. The event is a segment with semantic attributes and relationships. For example, the Batting Event in FIG. 7 is an event element that is described by a "Batting" (generic scene, semantic), "Bat by player #32, Yankees" (specific scene, semantic), and a "Good Strategy" (abstract scene, semantic) attributes. The syntactic attributes of the Batting Segment can apply to the Batting Event (i.e. we could have not distinguished between Batting Event and Batting Segment, and could have assigned the syntactic attributes of the Batting Segment to the Batting Event). The Batting Event is composed of the Field Object, and the Throwing and the Hitting Events, which represent the two main actions in the Batting Event (i.e. throwing and hitting the ball). The Throwing and the Hitting Events are related by a "Before" relationship (temporal relationship, syntactic).

Finally, the animated-object element is a semantic and spatial-temporal entity; it refers to an arbitrary section in an arbitrary set of frames of a video sequence. An animated object is defined by a set of syntactic and semantic features, and a graph of animated objects animated regions, regions, and objects that are related by composition, spatial-temporal, visual, and semantic relationships (see FIG. 5). The animated object is an event and an object at the same time. For example, the Pitcher Object in FIG. 8 is an animated object that is described by "Man" (generic object, semantic), "Player #3, Yankees" (specific object, semantic), and a "Speed" (abstract object, semantic) attributes. This animated object is "On top of" the Sand 3 Region shown in FIG. 9 (spatial-temporal relationship, syntactic). The syntactic features of Pitcher Regions may apply to the Pitcher Object. We separate the syntactic and the semantic attributes of this animated object as specified in the Generic AV DS. However, we lose flexibility and efficiency in doing so because we distribute the definition of the "real" object across different elements.

FIG. 5 provides fundamental models of each proposed type of content element. Attributes, elements, and relationships are categorized in the following classes: syntactic and semantic. The semantic and syntactic attributes have an associated attribute, level, whose value correspond to the level of the visual that they refer to. Syntactic elements are further divided in region, segment, and animated regions. Semantic elements are categorized in object, animated object, and event classes.

FIG. 6 depicts an exemplary baseball batting event.

FIG. 7 provides a conceptual description of the Batting Event for the Baseball game in FIG. 6 in accordance with the present invention.

FIG. 8 provides a conceptual description of the Hit and the Throw Events for the Batting Event in FIG. 6 in accordance with the present invention.

FIG. 9 provides a conceptual description of the Field Object for the Batting Event in FIG. 6 in accordance with the present invention.

Percept vs. Concept

The present invention may also be illustrated in connection with a discussion of percept and concept in analysis and classification of characteristics of images.

One of the difficulties inherent in the indexing of images is the number of ways in which they can be analyzed. A single image may represent many things, not only because it contains a lot of information, but because what we see in the image can be mapped to a large number of abstract concepts. A distinction between those possible abstract descriptions and more concrete descriptions based only on the visual aspects of the image constitutes an important step in indexing.

In the following sections, we make distinctions between percept and concept. We then provide definitions for syntax and semantics, and finally discuss general concept space and visual concept space. The importance of these definitions in the context of content-based retrieval will be apparent when we define our indexing structures.

Percept vs. Concept

Images are multi-dimensional representations of information, but at the most basic level they simply cause a response to light (tonal-light or absence of light). At the most complex level, however, images represent abstract ideas that largely depend on each individual's knowledge, experience, and even particular mood. We can make distinctions between percept and concept.

The percept refers to what our senses perceive—in the visual system it is light. These patterns of light produce the perception of different elements such as texture and color. No interpretation process takes place when we refer to the percept—no knowledge is required.

A concept, on the other hand, refers to an abstract or generic idea generalized from particular instances. As such, it implies the use of background knowledge and an inherent interpretation of what is perceived. Concepts can be very abstract in the sense that they depend on an individual's knowledge and interpretation—this tends to be very subjective.

Syntax and Semantics

In a similar way in which percepts require no interpretation, syntax refers to the way visual elements are arranged without considering the meaning of such arrangements. Semantics, on the other hand, deals with the meaning of those elements and of their arrangements. As will be shown in the discussion that follows, syntax can refer to several perceptual levels—from simple global color and texture to local geometric forms such as lines and circles. Semantics can also be treated at different levels.

General vs. Visual Concepts

Here we wish to emphasize that general concepts and visual concepts are different, and that these may vary among individuals.

Using a ball as an example, we see that while one possible general concept describes a ball as a round mass, different people may have different general concepts. A volleyball player may have a different general concept of a ball than a baseball player because, as described earlier, a concept implies background knowledge and interpretation. It is natural for different individuals to have very different interpretations of ideas (or in this case concrete objects). We divide concepts into general and visual concepts. It can be recognized that the attributes used for the general and visual concepts of a ball are different (rules could be used to describe concepts, but we use attributes instead to simplify the explanation).

These definitions are useful since they point out a very important issue in content-based retrieval: different users have different concepts (of even simple objects), and even simple objects can be seen at different conceptual levels. Specifically, there is an important distinction between general concept (i.e., helps answer the question: what is it?) and visual concept (i.e., helps answer the question: what does it look like?) and this must be considered when designing an image database. We apply these ideas to the construction of our indexing structures. Conceptual category structure may be based on perceptual structure.

Visual and Non-Visual Content

As noted in the previous section, there are many levels of information present in images, and their multi-dimensionality must be taken into account when organizing them in a digital library. The first step in creating a conceptual indexing structure is to make a distinction between visual and non-visual content. The visual content of an image corresponds to what is direclty perceived when the image is observed (i.e., descriptors stimulated directly by the visual content of the image or video in question—the lines, shapes, colors, objects, etc). The non-visual content corresponds to information that is closely related to the image, but that is not explicitly given by its appearance. In a painting, for example, the price, current owner, etc. belong to the non-visual category. Next we present an indexing structure for the visual content of the image and we follow with a structure for non-visual information.

Visual Content

Each of the levels of analysis that follows is obtained only from the image. The viewer's knowledge always plays a role, but the general rule here is that information not explicitly obtained from the image does not go into this category (e.g., the price of a painting would not be part of visual content). In other words, any descriptors used for visual content, are stimulated by the visual content of the image or video in question.

Our visual structure contains ten levels: the first four refer to syntax, and the remaining six refer to semantics. In addition, levels one to four are directly related to percept, and levels five through ten to visual concept. While some of these divisions may not be strict, they should be considered because they have a direct impact in understanding what the user is searching for and how he tries to find it in a database. They also emphasize the limitations of different indexing techniques (manual and automatic) in terms of the knowledge required. An overview of the structure is given in FIG. 3. Observing this figure from top to bottom, it is clear that at the lower levels of the pyramid, more knowledge and information is required to perform indexing. The width of each level gives an indication of the amount of knowledge required there—for example, more information is needed to name specific objects in a scene. Each level is explained below and a discussion of the relationship between levels appears thereafter.

Observing this structure, it will be apparent that most of the efforts in content-based retrieval have focused on syntax (i.e., levels one through four). Techniques to perform semantic classification at levels five through ten, however, are highly desirable. The structure we present, helps identify the level of attributes handled by a specific technique, or provided by a given description (e.g., MPEG-7 annotations).

Type/Technique

At the most basic level, we are interested in the general visual characteristics of the image or the video sequence. Descriptions of the type of image or video sequence or the technique used to produce it are very general, but prove to be of great importance. Images, for example, may be placed in categories such as painting, black and white (b&w), color photograph, and drawing. Related classification schemes at this level have been done conceptually, and automatically in WebSEEk.

In the case of digital photographs, the two main categories could be color and grayscale, with additional categories/descriptions which affect general visual characteristics. These could include number of colors, compression scheme, resolution, etc. We note that some of these may have some overlap with the non-visual indexing aspects described herein.

Global Distribution

The type/technique in the previous level gives general information about the visual characteristics of the image or the video sequence, but gives little information about the visual content. Global distribution aims to classify images or video sequences based on their global content and is measured in terms of low-level perceptual features such as spectral sensitivity (color), and frequency sensitivity (texture). Individual components of the content are not processed at this level (i.e., no "form" is given to these distributions in the sense that the measures are taken globally). Global distribution features, therefore, may include global color (e.g., dominant color, average, histogram), global texture (e.g., coarseness, directionality, contrast), global shape (e.g. aspect ratio), global motion (e.g. speed, acceleration, and trajectory), camera motion, global deformation (e.g. growing speed), and temporal/spatial dimensions (e.g. spatial area and temporal dimension), among others. Consider, for instance, two images that have similar texture/color. Notice that in this particular case these attributes are quite useful, but they would not be useful if a user were searching for an object.

Even though some of these measures are difficult to quantify for a human observer, these global low-level features have been successfully used in various content-based retrieval systems to perform query by example (QBIC, WebSEEk, Virage) and to organize the contents of a database for browsing.

Local Structure

In contrast to Global Structure, which does not provide any information about the individual parts of the image or the video sequence, the Local Structure level is concerned with the extraction and characterization of the image's components. At the most basic level, those components result from low-level processing and include elements such as the Dot, Line, Tone, Color, and Texture. In the Visual Literacy literature, some of these are referred to as the "basic elements" of visual communication and are regarded as the basic syntax symbols. Other examples of local structure attributes are temporal/spatial position (e.g. start time and centroid), local color (e.g. M×N Layout), local motion, local deformation, and local shape/2D geometry (e.g. bounding box). There are various images in which attributes of this type may be of importance. In x-rays and microscopic images there is often a strong concern for local details. Such elements have also been used in content-based retrieval systems, mainly on query by user-sketch interfaces. The concern here is not with objects, but rather with the basic elements that represent them and with combinations of such elements—a square, for example, is formed by four lines. In that sense, we can include here some "basic shapes" such as circle, ellipse and polygon. Note that this can be considered a very basic level of "grouping" as performed by humans when perceiving visual information.

Global Composition

At this level, we are interested in the specific arrangement of the basic elements given by the local structure, but the focus is on the Global Composition. In other words, we analyze the image as a whole, but use the basic elements described above (line, circle, etc.) for the analysis.

Global Composition refers to the arrangement or spatial layout of elements in the image. Traditional analysis in art describes composition concepts such as balance, symmetry, center of interest (e.g., center of attention or focus), leading line, viewing angle, etc. At this level, however, there is no knowledge of specific objects; only basic elements (i.e. dot, line, etc.) or groups of basic elements are considered. In that sense, the view of an image is simplified to an image that contains only basic syntax symbols: an image is represented by a structured set of lines, circles, squares, etc.

Generic Objects

Up to the previous level the emphasis had been on the perceptual aspects of the image. No world knowledge is required to perform indexing at any of the levels above, and automatic techniques rely only on low-level processing. While this is an advantage for automatic indexing and classification, studies have demonstrated that humans mainly use higher level attributes to describe, classify and search for images. Objects are of particular interest, but they can also be placed in categories at different levels—an apple can be classified as a Macintosh apple, as an apple or as a fruit. When referring to Generic Objects, we are interested in the basic level categories: the most general level of object description. In the study of art, this level corresponds to pre-Iconography, and in information sciences one refers to it as the generic of level. The common underlying idea in these concepts and our definition of Generic Objects is that only general everyday knowledge is necessary to recognize the objects. A Macintosh apple, for example, would be classified as an apple at this level: that is the most general level of description of that object.

A possible difference between our definition and the definitions previously used in the art lies in the fact that we define visual objects as entities that can be seen, sometimes differing from the traditional definition of object. Objects like the sky or the ocean would perhaps not be considered objects under the traditional definition, but correspond to our visual objects (as well as the traditional objects like car, house, etc.).

Generic Scene

Just as an image can be indexed according to the individual objects that appear in it, it is possible to index the image as a whole based on the set of all of the objects it contains and their arrangement. Examples of scene classes include city, landscape, indoor, outdoor, still life, portrait, etc. Some work in automatic scene classification has been performed, and studies in basic scene categories are also extant.

The guideline for this level is that only general knowledge is required. It is not necessary to know a specific street or building name in order to determine that it is a city scene, nor is it necessary to know the name of an individual to know that it is a portrait.

Specific Objects

In contrast to the previous level, Specific Objects refers to objects that can be identified and named. Shatford refers to this level as specific of. Specific knowledge of the objects in the image is required, and such knowledge is usually objective since it relies on known facts. Examples include individual persons, and objects.

Specific Scene

This level is analogous to General Scene with the difference that here there is specific knowledge about the scene. While different objects in the image may contribute in different ways to determine that the image depicts a specific scene, a single object is sometimes enough. A picture that clearly shows the Eiffel Tower, for example, can be classified as a scene of Paris, based only on that object.

Abstract Objects

At this level, specialized or interpretative knowledge about what the objects represent is used. This is referred to as Iconology (interpretation) in art, or the about level. This indexing level is the most difficult one in the sense that it is completely subjective and assessments between different users vary greatly. The importance of this level was shown in experiments, where viewers used abstract attributes to describe images. For example, a woman in a picture may represent anger to one observer, or perhaps pensiveness to another observer.

Abstract Scene

The Abstract Scene level refers to what the image as a whole represents. It may be very subjective. Users sometimes describe images in affective (e.g. emotion) or abstract (e.g. atmosphere, theme) terms. Other examples at the abstract scene level include sadness, happiness, power, heaven, and paradise.

Relationships Across Levels

We have chosen a pyramid representation because it directly reflects several important issues inherent in our structure. It is apparent that at the lower levels of the pyramid, more knowledge and information is required to perform the indexing. This knowledge is represented by the width of each level. It is important to point out, however, that this assumption may have some exceptions. An average observer, for example, may not be able to determine the technique that was used to produce a painting—but an expert in art would be able to determine exactly what was used. Indexing in this particular case would require more knowledge at the type/technique level than at the generic objects level (since special knowledge about art techniques would be needed). In most cases, however, the knowledge required for indexing will increase in our structure from top to bottom: more knowledge is necessary to recognize a specific scene (e.g., Central Park in New York City) than to determine the generic scene level (e.g., park).

Although inter-level dependencies exist, each level can be seen as an independent perspective or dimension when observing an image and the way each level is treated will depend on the nature of the database, users and purpose.

Visual Content Relationships

In this section, we briefly present a representation for relations between image elements[8]. This structure accommodates relations at different levels and is based on the visual structure presented earlier. We note that relations at some levels are most useful when applied between entities to which the structure is applied (e.g., scenes from different images may be compared). Elements within each level are related according to two types of relations: syntactic and semantic (only for levels 5 through 10). For example: two circles (local structure) can be related spatially (e.g., next to), temporally (e.g., before) and/or visually (e.g., darker than). Elements at the semantic levels (e.g., objects) can have syntactic and semantic relations—(e.g., two people are next to each other, and they are friends). In addition, each relation can be described at different levels (generic, specific, and abstract). We note that relations between levels 1, 6, 8, and 10 can be most useful between entities represented by the structure (e.g., between images, between parts of images, scenes, etc.)

The visual structure may be divided into syntax/percept and visual concept/semantics. To represent relations, we observe such division and take into consideration the following: (1) Knowledge of an object embodies knowledge of the object's spatial dimensions, that is, of the gradable characteristics of its typical, possible or actual, extension in space; (2) knowledge of space implies the availability of some system of axes which determine the designation of certain dimensions of, and distances, between objects in space. We use this to argue that relations that take place in the syntactic levels of the visual structure can only occur in 2D space since no knowledge of the objects exist (i.e., relationships in 3D space cannot be determined). At the local structure level, for example, only the basic elements of visual literacy are considered, so relations at that level are only described between such elements (i.e., which do not include 3D information). Relations between elements of levels 5 through 10, however, can be described in terms of 2D or 3D.

In a similar way, the relations themselves are divided into the classes syntactic (i.e., related to perception) and semantic (i.e. related to meaning). Syntactic relations can occur between elements at any of the levels, but semantic relations occur only between elements of levels 5 through 10. Semantic relationships between different colors in a painting, for example, could be determined (e.g., the combination of colors is warm), but we do not include these at that level of our model.

We divide spatial relationships into the following classes: (1) topological (i.e., how the boundaries of elements relate) and (2) orientation (i.e., where the elements are placed relative to each other). Topological relations include near, far, touching, etc. and orientation relations include diagonal to, in front of, etc.

Temporal relations refer to those that connect elements with respect to time (e.g., in video these include before, after, between, etc.), and visual relations refer only to visual features (e.g., bluer, darker, etc.). Semantic relations are associated with meaning (e.g., owner of, friend of, etc.).

In a similar way in which the elements of the visual structure have different levels (generic, specific, abstract), relations can be defined at different levels. Syntactic relations can be generic (e.g., near) or specific (e.g, a numerical distance measure). Semantic relationships can be generic, specific, or abstract.

As an example, spatial global distribution could be represented by a distance histogram, local structure by relations between local components (e.g., distance between visual literacy elements), and global composition by global relations between visual literacy elements.

Non-Visual Information

As explained at the beginning of this section, non-visual information refers to information that is not directly part of the image, but is rather associated with it in some way. One may divide attributes into biographical and relationship attributes. While it is possible for non-visual information to consist of sound, text, hyperlinked text, etc., our goal here is to present a simple structure that gives general guidelines for indexing. We will focus briefly on text information only. FIG. 10 gives an overview of this structure.

Biographical Information

The source for the actual image may be direct (e.g., a photograph of a natural scene) or indirect (e.g., image of a sculpture, painting, building, drawing). In either case, there may be Biographical Information associated with the image. This information can repeat itself for several objects in the image (e.g., an image of the ceiling of the Sistine chapel may have information about the painting and the chapel itself), exist for the image only, or not exist at all. In most cases, Biographical Information is not directly related to the subject of the image, but rather to the image as a whole. Examples include the author, date, title, material, technique, etc.

Associated Information

The second class of non-visual information is directly linked to the image in some way. Associated Information may include a caption, article, a sound recording, etc. As discussed, in many cases this information helps perform some of the indexing in the visual structure, since it may contain specific information about what is depicted in the image (i.e., the subject). In that context, it is usually very helpful at the semantic levels since they require more knowledge that is often not present in the image alone. In some cases, however, the information is not directly related to the subject of the image, but it is associated to the image in some way. A sound recording accompanying a portrait, for example, may include sounds that have nothing to do with the person being depicted—they are associated with the image though, and could be indexed if desired.

Physical Attributes

Physical Attributes simply refer to those that have to do with the image as a physical object. This may include location of the image, location of the original source, storage (e.g., size, compression), etc.

Relationships Between Indexing Structures

Figure 11:
FIG. 11 illustrates how visual and non-visual information may be used semantically to characterize an image or its parts.

We define a Semantic Information Table to gather high level information about the image (ee FIG. 11). The table can be used for individual objects, groups of objects, the entire scene, or parts of the image. In most cases visual and non-visual information contribute in filling in the table—simple scene classes such as indoor/outdoor may not be easily determined from the visual content alone; location may not be apparent from the image, etc. Individual objects can be classified and named based on the non-visual information, contributing to the mapping between visual object and conceptual object.

In FIG. 11, visual and non-visual information can be used to semantically characterize an image or its parts. The way in which these two modalities contribute to answer the questions in the semantic table may vary depending on the content. The table helps answer questions such as: What is the subject (person/object, etc.)?, What is the subject doing? Where is the subject? When? How? Why? The table can be applied to individual objects, groups of objects, the entire scene, or parts of the image.

The relationship between this structure and the visual structure is apparent when applying the table at each level beginning with level 5. We also note that while the table provides a compact representation for some information related to the image, it does not replace the indexing structures presented. The group of structures provides the most complete description.

Having the appropriate indexing structures, we can focus on how the contents of a digital library may be organized. In the next section, we analyze issues that play a crucial role in the organization and retrieval of images.

Features, Similarity, and Categorization

In order to be successful at building an image digital library, it is not only important to understand the data, but also the human issues related to classification. In this section we discuss issues of importance in this respect, and explain how we apply the concepts in building our image indexing test bed. First, we discuss categories. Then, we discuss levels and structure in categorization. Finally, we present some of the issues related to attributes and similarity.

Categories and Classification

Categorization can be defined as treating a group of entities as equivalent. A category is any of several fundamental and distinct classes to which entities or concepts belong—entities within categories appear more similar and entities between categories appear less similar. Before categorization can be undertaken, however, it is essential to have an understanding of the nature of the data being categorized. We can now focus on the types of categories that could be used. In the literature of classification, researchers have identified two kinds of categories: (1) Sensory Perception categories (e.g., texture, color or speech sounds—/e/), and (2) Generic Knowledge (GK) categories (e.g., natural kinds—birds, artifacts—cars and events—eating).

In our structure we can identify Sensory Perception categories such as color and texture. GK categories, however, play a very important role since users are mainly interested in the objects that appear in the images and what those objects may represent. Some theories in cognitive psychology express that classification in GK categories is done as follows:

Rules: attribute values of the entity are used (e.g., rule: an image in the people category should have a person in it).

Prototypes: a prototype of the category contains the characteristic attributes of its category's exemplars. These are attributes that are highly probable across category members, but are neither necessary nor sufficient for category membership. A new image is classified according to how similar it is to the category's prototype (e.g., a prototype for the landscape class could be simple sketch of a sunset).

Exemplars: an instance is classified according to its most similar exemplar's category (e.g., instead of having a rule for the people category, we could have a set of example images in that class and use those for classification).

This evidence is helpful in terms organizing images in a database because we can use these techniques to perform classification and to present results to the user. These concepts are being used in the development of our image indexing test bed.

Category Structure

Category structure is a crucial factor in a digital library and brings about several issues of importance which we briefly discuss here. The following issues should be considered: relationships between categories (e.g., hierarchical or entity-relation), the levels of abstraction at which classification should be performed (e.g., studies by Rosch) suggest the existence of a basic level and subordinate/superordinate level categories), horizontal category structure (i.e., how each category should be organized and the degrees of membership of elements within each category—these can be fuzzy or binary), etc.

In addition to considering different levels of analysis when indexing visual information, the way in which similarity is measured is of great importance. Issues related to measurements of similarity include the level of consideration (e.g., part vs. whole), the attributes examined, the types of attributes (e.g., levels of our structures), whether the dimensions are separable or not, etc.

The Image Indexing Test Bed

We are developing an image indexing test bed that incorporates the concepts presented herein, using different techniques to index images based on the structure set forth herein. In particular, for type/technique we are using discriminant analysis. For global distribution, we use global color histograms and Tamura texture measures. At the local structure level, we allow sketch queries as in VideoQ, by using automatic segmentation and also multi-scale phase-curvature histograms of coherent edge-maps and projection histograms. Global composition is obtained by performing automatic segmentation and merging of generated regions to yield iconic representations of the images.

Generic objects are being automatically detected using the Visual Apprentice. In the Visual Apprentice, visual object detectors are built by defining an object definition hierarchy (i.e., specifying the model of an object and its parts) and providing the system with examples. Multiple classifiers are learned automatically by the system at different levels of the hierarchy (region, perceptual, object-part, and object), and the best classifiers are automatically selected and combined when performing automatic classification. We also use the AMOS system to perform manual annotation of objects and object search.

At the generic scene level we perform city vs. landscape and indoor vs. outdoor classification. This is done automatically using the OF*IIF technique in which clustering and classification of image regions is performed in conjunction with textual features (e.g., from the image caption), if available, and specialized object detectors (e.g., face or sky detector).

Information about specific objects and scenes is obtained from the associated information using a s system which extracts names of people, places, etc. Annotations at the abstract levels, when performed, are being done manually.

Audio

Another illustrative discussion of the advantages of the present invention may be provided by setting forth an exemplary description of its use in conjunction with a digital signal that represents audio content.

We previously proposed a ten-level conceptual structure to index the visual content elements (e.g. regions, entire images, events, etc.) of images. The classification in that work refers only to descriptors for visual content (i.e., not meant for "metadata"—for example, the name of the person who took the photograph is not a visual descriptor).

In this document, we propose the classification of audio descriptors (to be included in the MPEG-7 audio part of the standard), based on the ten-level conceptual structure presented earlier. The pyramid structure we propose contains exactly the same levels as the visual structure previously described in connection with FIG. 3 and FIG. 4. Each level, however, refers to audio elements instead of visual elements. In the original structure, an object corresponds to a visual entity. In the new structure, an object corresponds to an audio entity (e.g., a person's voice).

The importance of the separation between syntax and semantics has been widely identified by researchers in the area of image and video indexing. Although we are not aware of similar studies for audio content, the results from the studies examined suggest that this separation is very useful in audio indexing also. For instance, studies in information retrieval and cognitive psychology have shown how individuals use different levels to describe (or index) images/objects. While some of the divisions we present may not be strict, they should be considered because they have a direct impact on how the audio content is indexed, handled and presented to the users (e.g., applications or human viewers) of such content.

The structure presented earlier for visual attributes, which draws on research from different fields related to image indexing, provides a compact and organized classification that can be easily applied to audio. The structures are intuitive and highly functional and stress the need, requirements, and limitations of different indexing techniques (manual and automatic). The indexing cost (computational or in terms of human effort) for an audio segment, for example, is generally higher at the lower levels of the pyramid: automatically determining the type of content (music vs. voice) vs. recognizing generic objects (e.g., voice of a man) vs. recognizing specific objects (e.g., voice of Bill Clinton). This also implies that more information/knowledge is required at the lower levels and if a user (e.g. application) makes a request to another user (e.g., application), there will be clarity regarding how much additional information might be needed, or what level of "service" a user can expect from, say, a level 5 audio classifier. In addition, this breakdown of the attributes and relationships is of great value since humans often make comparisons based on attributes. The benefits of the structures proposed have been shown in preliminary experiments for visual content, and efforts to conduct core experiments are also being made. These experiments, and the flexibility that allows the use of the structure for audio indexing suggest the benefits of applying this sort of descriptor classification to audio and visual content.

In this example we describe the classification of audio attributes. We also describe audio relationships.

Classification of Descriptors

The proposed audio structure contains ten levels: the first four refer to syntax, and the remaining six refer to semantics. An overview for the audio structure can be drawn from FIG. 3. The width of each level in an indication of the amount of knowledge/information required. The syntax levels are type/technique, global distribution, local structure, and global composition. The semantic levels are generic object, generic scene, specific object, specific scene, abstract object, and abstract scene.

The syntax levels classify syntactic descriptors, that is, those that describe the content in terms of low-level features. In the visual structure, these referred to the colors and textures present in the image. In the audio structure of this document, they refer to the low-level features of the audio signal (whether it is music, voice, etc.). Examples include the fundamental frequency, harmonic peaks, etc.

The semantic levels of the visual structure classified attributes related to objects and scenes. The semantic levels in the audio structure are analogous, except that the classification is based on the attributes extracted from the audio signal itself. Like in the visual case, in audio it is possible to identify objects (e.g., voice of a man, sound of a trumpet, etc.), and scenes (e.g., street noise, opera, etc.).

Each level of the visual structure, which is analogous, has been explained previously. Next, we briefly explain each level and describe how it can be used for the classification of audio descriptors. We use the words attribute and descriptor interchangeably, and give intuitive examples for each level, making analogies with the visual structure to help clarify the explanations. For the semantic levels, it is useful to think of a typical radio news broadcast, in which different entities are used interchangeably—persons, noises, music, and scenes (e.g., it is common in on-site reports to hear background noise or music, during, before and after a journalist's report).

Type/Technique

General descriptions of the type of audio sequence. For example: music, noise, voice, or any combination of them: stereo, number of channels, etc.

Global Distribution

Attributes that describe the global content of audio, measured in terms of low-level features. The attributes at this level are global because they are not concerned with individual components of the signal, but rather with a global description. For example, a signal can be described as being Gaussian noise—such description is global because it doesn't say anything about the local components (e.g., what elements, or low-level features describe the noise signal).

Local Structure

Concerned with the extraction and characterization of individual low-level syntactic components in the audio segment. In contrast to the previous level, attributes here are meant to describe the local structure of the signal. In an image, the local elements are given by basic syntax symbols that are present in the image (e.g., lines, circles, etc.). This level serves the same function in audio, so any low-level (i.e., not semantic such as a word, or a letter in spoken content) local descriptor would be classified at this level.

Global Composition

Global description of an audio segment based on the specific arrangement or composition of basic elements (i.e., the local structure descriptors). While local structure focuses on specific local features of the audio, Global Composition focuses on the structure of the local elements (i.e., how they are arranged). For example, an audio sequence can be represented (or modeled) by a Markov chain, or by any other structure that uses low-level local features.

Generic Objects

Up to the previous level, no world knowledge is required to perform indexing-quantitative features can be automatically extracted from the audio segment and classified into the syntactic levels described. When the audio segment is described in terms of semantics (e.g., recognition), however, objects play an important role. Objects, however, can be placed in categories at different levels—an apple can be classified as a Macintosh apple, as an apple, or as a fruit. The recognition of an object, can be based on an audio segment, and therefore we can make a similar classification. For example, we can say that an audio entity corresponds (e.g., a voice) to a man, or to Bill Clinton. When referring to Generic Objects, we are interested in the basic level categories: the most general level of object description, which can be recognized with everyday knowledge. That means there is no knowledge of the specific identity of the object in question (e.g., explosion, rain, clap, man's voice, woman's voice, etc.). Audio entity descriptors can be classified at this level.

Generic Scene

Just as an audio segment can be indexed according to individual objects, it is possible to index the audio segment as a whole based on the set of all of the entities it contains and their arrangement. Examples of audio scene classes include street noise, stadium, office, people talking, concert, newsroom, etc. The guideline for this level is that only general knowledge is required. It is not necessary to recognize a specific audio entity (e.g., who's voice it is), or a specific audio scene (e.g., which concert it is) to obtain a descriptor at this level.

Specific Objects

In contrast to the previous level, Specific Objects refer to identified and named audio entities. Specific knowledge is required, and such knowledge is usually objective since it relies on known facts—at this level, noises or sounds are identified and named. Examples include the voice of individual persons (e.g., "Bill Clinton") or characteristic noises (e.g., bell of NY stock exchange), etc.

Specific Scene

This level is analogous to Generic Scene with the difference that here there is specific knowledge about a scene in the audio segment. For example, the "I have a dream" speech of Martin Luther King—the audio scene can be specifically identified and named. The moon landing in 1968, etc.

Abstract Objects

At this level, subjective knowledge about what the audio entities represent is used. This indexing level is the most difficult one in the sense that it is completely subjective and assessments between different users may vary greatly. The importance of this level was shown, for images, in experiments, where viewers used abstract attributes to describe images, among others. Emotive attributes, can also be assigned to objects in an audio segment. For example, a sound (e.g., in a movie, in music), may be described as scary, happy, etc.

Abstract Scene

The Abstract Scene level refers to what the audio segment as a whole represents. It may be very subjective. For images, it has been shown, for example, that users sometimes describe images in affective (e.g. emotion) or abstract (e.g. atmosphere, theme) terms. Similar descriptions can be assigned to audio segments, for example, attributes to describe an audio scene could include: sadness (e.g., people crying), happiness (e.g., people laughing), etc.

Relationships

Types of Relationships

Figure 12:
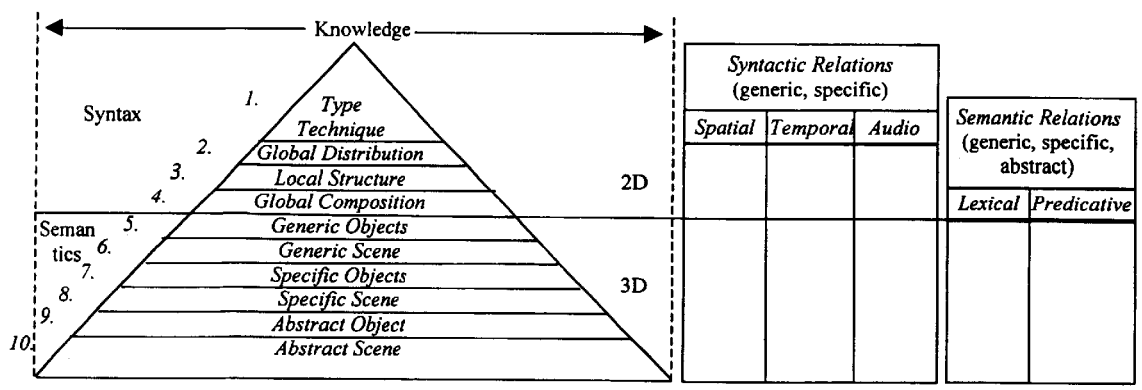
FIG. 12 illustrates relationships at different levels of the audio structure. Elements within the syntactic levels are related according to syntactic relationships. Elements within the semantic levels are related according to syntactic and semantics relationships.

In this section, we present the explicit types of relationships between content elements that we propose. These relationships are analogous to those presented earlier for visual content. As shown in FIG. 12, relationships are defined at the different levels of the audio structure presented earlier in connection with FIG. 3. To represent relationships among content elements, we consider the division into syntax and semantics.

At the syntactic levels, there can be syntactic relationships, i.e. spatial (e.g., "sound A is near sound B"), temporal (e.g. "In parallel"), and audio (e.g. "Louder than") relationships, which are based uniquely on syntactic Knowledge. Spatial and temporal attributes are classified in topological and directional classes. Audio relationships can be further indexed into global, local, and composition. As shown in FIG. 12, elements within these levels could be associated with not only semantic relationships, but also syntactic relationships (e.g. "the trumpet sounds near the violin", and "the trumpet notes complement the violin notes"). We distinguish between two different types of semantic relationships: lexical relationships such as synonymy, antonymy, hyponymy/hypernymy, and meronymy/holonymy; and predicative relationships referring to actions (events) or states.

The relationships we propose here are analogous to those proposed for video signals—the only difference in the two cases resides on the attributes used, but not the relationships. For example: from an image, it would not be possible to say that element A is louder than element B. From an audio segment, it would not be possible (unless explicitly described in the audio content itself) that element A is darker than element B. The type of relationship, however, is the same: one is audio and the other one is visual, but they are both global generic (see Table 4).

We shall explain more extensively the syntactic and the semantic relationships with examples. Tables 3 and 4 below summarize the indexing structures for the relationships including examples.

Syntactic Relationships

We divide the syntactic relationships into three classes: spatial, temporal, and audio. One could argue that the spatial and the temporal relationships are just special cases of audio relationships. We define spatial and temporal relationships in a special way, however, since we consider the elements as boundaries in space or time with no information about or duration, respectively. See Table 3 for a summary of the proposed types of syntactic relationships and examples.

We divide the spatial relationships into the following classes: (1) topological, i.e. how boundaries of elements relate; and (2) orientation or directional, i.e. where the elements are placed relative to each other (see Table 3). Note that these relationships can often be extracted from an audio segment: listening to a stereo broadcast of a news report, for example, it is often easy to assign syntactic attributes to the audio entities. For example, it is possible to assess that one sound is near another, or rather, the syntactic relationships between different sound sources. In this respect, one could determine somewhat detailed topological and directional relationships that may not be explicit in the signal. Examples of topological relationships are "To be near to", "To be within", and "To be adjacent to"; examples of directional relationships are "To be in front of", and "To be to the left of". Note that the main difference between these relationships and those obtained from visual information lies on the extraction of the relationships themselves—it may be more difficult to determine some spatial relationships from the audio alone, but in creation of synthetic audio models, these relationships play a very important role.

In a similar fashion, we classify the temporal relationships into topological and directional classes (see Table 3). Examples of temporal topological relationships are "To happen in parallel", "To overlap", and "To happen within"; examples of directional temporal relationships are "To happen before", and "To happen after". SMIL's parallel and sequential relationships are examples of temporal topological relationships.

Audio relationships relate audio entities based on their visual attributes or features. These relationships can be indexed into global, local, and composition classes (see Table 3). For example, an audio global relationship could be "To be less noisy than" (based on a global noise feature), an audio local relationship could be "is louder than" (based on a local loudness measure), and an audio composition relationship could be based on comparing the structures of a Hidden Markov Models.

In a similar way in which the elements of the audio structure have different levels (generic, specific, and abstract), these types of syntactic relationships (see Table 3) can be defined in a generic level ("Near") or a specific level ("10 meters from"). For example, operational relationships such "To be the union of", "To be the intersection of", and "To be the negation of" are topological, specific relationships either spatial or temporal (see Table 3).

Semantic Relationships

Semantic relationships can only occur among content elements at the semantic levels of the ten-level conceptual structure. We divide the semantic relationships into lexical and predicative relationships. Table 4 summarizes the semantic relationships including examples. Note that since semantic relationships are based on understanding of the content, we can make the same classification for relationships obtained from visual content as for relationships obtained from audio content. The semantic relationships here, therefore, are identical to those described in connection with video signals. The only difference lies in the way the semantic content is extracted (i.e., understanding the audio vs. understanding an image or video). To make the explanation more clear, we have used examples related to audio, although the original examples would also apply. For instance: that apple is like that orange, as a generic synonymy example—the apple and orange could be "recognized" from the audio, if a speaker talks about them.

The lexical semantic relationships correspond to the semantic relationships among nouns used in WordNet. These relationships are synonymy (violin is similar to a viola), antonymy (flute is opposite to drums), hyponymy (a guitar is a string instrument), hypernymy (a string instrument and a guitar), meronymy (a musician is member of a musical band), and holonymy (a musical band is composed of musicians).

The predicative semantic attributes refer to actions (events) or states among two ore more elements. Examples of action relationships are "To yell at" and "To hit" (e.g., hit a ball). Examples of state relationships are "To belong" and "To own". Instead of only dividing the predicative semantic into actions or states, we could use the partial relational semantic decomposition used in WordNet. WordNet divides verbs into 15 semantic domains: verbs of bodily care and functions, change, cognition, communication, competition, consumption, contact, creation, emotion, motion, perception, possession, social interaction, and weather verbs. Only those domains that are relevant for the description of visual concept could be used.

As for the ten-level audio structure presented herein, we can define semantic relationships at different levels: generic, specific, and abstract. For example, a generic action relationship is "To own stock", a specific action relationship is "To own 80% of the stock", and, finally, an abstract semantic relationships is "To control the company".

TABLE 3

Indexing structure for syntactic relationships and examples.

| Types of relationships | | | Levels | Examples |
|---|---|---|---|---|
| Syntactic | Spatial | Topological | Generic | § Near from, Far from, Adjacent to, Contained in, Composed of; Consist of |
| | | | Specific | § The union, The intersection, The negation, Normal decompositon, Free decompositon<br>§ 10 meters from |
| | | Directional | Generic | § Left of, Top of, Upper left of, Lower right of. Behind |
| | | | Specific | § The union, The intersection, The negation<br>§ 20 degrees north from, 40 degrees east from, the union of two segments |
| | Temporal | Topological | Generic | § Co-begin, Parallel, Sequential, Overlap, Adjacent, Within, Composed, Consist of<br>§ SMIL's <seq> and <par> |
| | | | Specific | § 20 min. apart from, 20 sec. Overlapping<br>§ SMIL's <seq> and <par> with attributes (start time, end time, duration) |
| | | Directional | Generic | § Before, After |

TABLE 3-continued

Indexing structure for syntactic relationships and examples.

| Types of relationships | | Levels | Examples |
|---|---|---|---|
| Audio | tional Global | Specific | § 20 min. after |
| | | Generic | § Louder than, Softer than, Similar speed |
| | | Specific | § Distance in global feature<br>§ Indexing hierarchy based on global feature |
| | Local | Generic | § Faster than, To grow slower than, Similar speed, Similar shape |
| | | Specific | § 5 dB louder than<br>§ Indexing hierarchy based on pitch |
| | Composition | Generic | § HMM structure A has the same number of states as structure B |
| | | Specific | § Distance in composition feature<br>§ Indexing hierarchy based on composition features |

TABLE 4

Indexing structure for semantic relationships and examples.

| Types of attributes | | | Levels | Examples |
|---|---|---|---|---|
| Semantic | Lexical | Synonymy To be Similar to | Generic | Symphony A is like Symphony B |
| | | | Specific | Symphony A has as many movements as Symphony B |
| | | | Abstract | Symphony A is as sad as Symphony B |
| | | Antonymy To be opposite to | Generic | Sound A is different from sound B |
| | | | Specific | Sound A is 30 dB louder than sound B |
| | | | Abstract | Sound A is smooth, sound B is rough |
| | | Hyponymy Hypernymy To be a - To be a type of | Generic | Composition A is an opera |
| | | | Specific | Composition A is modern American opera |
| | | | Abstract | Composition A is a beautiful opera |
| | | Meronymy Holonymy To be a part/ member of - To be the whole of | Generic | Movement A is part of an opera |
| | | | Specific | Movement A is part of La Traviata |
| | | | Abstract | Movement A is the best one in La Traviata |
| | Predicative | Action/ Event | Generic | Person A speaks to reporters |
| | | | Specific | Person A speaks to reporters about a conflict in Ethiopia |
| | | | Abstract | Person A speaks well |
| | | State | Generic | The song has different parts |
| | | | Specific | The song has exactly three parts |
| | | | Abstract | The song is sad |

The present invention includes not only methods, but also computer-implemented systems for multiple level classifications of digital signals (e.g., multimedia signals) for indexing and/or classification purposes. The methods described hereinabove have been described at a level of some generality in accordance with the fact that they can be applied within any system for processing digital signals of the type discussed herein—e.g., any of the art-recognized (or future-developed) systems compatible with handling of digital multimedia signals or files under the MPEG-7 standards.

As the purpose of standards for digital signals, generically considered, is to promote cross-platform compatibility for transmission, archiving, and output of such signals, it is not necessary or desirable to give system-specific specifications for the systems that could be built implementing the present invention. Rather, those of ordinary skill in the art will recognize how to implement the generic teachings herein using desired hardware and software techniques as known in the art.

To give a broad example, one could consider an exemplary embodiment of a system for practicing the present invention in conjunction with any multimedia-compatible device for processing, displaying, archiving, or transmitting digital signals (including but not limited to video, audio, still image, and other digital signals embodying human-perceptible content), such as a personal computer workstation including a Pentium microprocessor, a memory (e.g., hard drive and random access memory capacity), video display, and appropriate multimedia appurtenances.

Summary

The present invention proposes fundamental entity-relationship models for the current Generic AV DS to address the shortcomings relating to its global design. The fundamental entity-relation models index (1) the attributes of the content elements, (2) the relationships among content elements, and (3) the content elements themselves. We choose this modeling technique because entity-relationship models are the most widely used conceptual models. They provide a high degree of abstraction and are hardware and software independent.

We make the distinction between syntax and semantics for attributes (or MPEG-7 descriptors), relationships, and content elements. Syntax refers to the way the content elements are arranged without considering the meaning of such arrangements. Semantics, on the other hand, deals with the meaning of those elements and of their arrangements. Syntactic and semantic attributes can refer to several levels. Similarly, syntactic and semantic relationships can be further divided into sub-types referring to different levels. We provide compact and clear definitions of the syntactic and semantic elements based on their types of attributes and relationships with other elements. An importance difference with the Generic AV DS, however, is that our semantic elements include not only semantic attributes but also syntactic attributes. Therefore, if an application would rather not distinguish between syntactic and semantic elements, it can do so by using only semantic elements.

The foregoing examples and illustrative embodiments of the present invention are set forth for exemplary purposes. Those of ordinary skill in the art will recognize that these teaching examples do not define the limits of the spirit or scope of the present invention, which are limited only by the appended claims.

We claim as our invention and desire to secure protection for:

1. A method for indexing a plurality of digital information signals for a media content management system, comprising the step of:
   for each of the signals for the system, processing the signal through a multi-level indexing module which supports syntactic and semantic levels, wherein said module is operative for:
   (i) receiving and analyzing the signal in accordance with a plurality of defined indexing levels for content of the signal;
   (ii) for at least one of said indexing levels, extracting content-based data of the signal relative to each said indexing level, wherein said content-based data comprises at least one of a datum relating to a description element, to an attribute, and to a relationship among descriptions elements.

2. The method of claim 1, wherein said syntactic levels comprise at least one level chosen from the group of levels consisting of:
   (i) type/technique;
   (ii) global distribution;
   (iii) local structure; and
   (iv) global composition.

3. The method of claim 1, wherein said semantic levels comprise at least one level chosen from the group of levels consisting of:
   (i) generic object;
   (ii) generic scene;
   (iii) specific object;
   (iv) specific scene;
   (v) abstract object; and
   (vi) abstract scene.

4. The method of claim 1, wherein said description elements comprise syntactic elements.

5. The method of claim 4, wherein said syntactic elements comprise at least one element chosen from the group of elements consisting of:
   (i) region;
   (ii) animated region; and
   (iii) segment.

6. The method of claim 1, wherein said description elements comprise semantic elements.

7. The method of claim 6, wherein said semantic elements comprise at least one element chosen from the group of elements consisting of:
   (i) object;
   (ii) animated object; and
   (iii) event.

8. The method of claim 1, wherein said attributes comprise attributes chosen from the group consisting of:
   (i) syntactic, and
   (ii) semantic.

9. The method of claim 1, wherein said relationships comprise syntactic relationships.

10. The method of claim 9, wherein said syntactic relationships comprise relationships chosen from the group consisting of:
    (i) spatial,
    (ii) temporal, and
    (iii) visual relationships.

11. The method of claim 1, wherein said relationships comprise semantic relationships.

12. The method of claim 11, wherein said semantic relationships comprise at least one relationship chosen from the group consisting of:
    (i) lexical; and
    (ii) predicative relationships.

13. The method of claim 1, wherein said digital information signals comprise multimedia data files.

14. The method of claim 13, wherein said multimedia data files comprise video files.

15. The method of claim 13, wherein said multimedia data files comprise audio files.

16. The method of claim 1, wherein said digital information signals comprise fractional portions of multimedia data files.

* * * * *

UNITED STATES PATENT AND TRADEMARK OFFICE
CERTIFICATE OF CORRECTION

PATENT NO. : 6,847,980 B1  Page 1 of 2
DATED : January 25, 2002
INVENTOR(S) : Ana B. Benitez et al.

It is certified that error appears in the above-identified patent and that said Letters Patent is hereby corrected as shown below:

Drawings,
Figure 2, "a young boy eats an apple in 4 minutes" should read -- a young boy slowly eats an apple --

Column 16,
Table 2, "the girls" should be located under the Examples column, instead of the Levels column, so lines 16 and 17 in the examples column should read
-- The boys are playing with
the girls --

Column 20,
Line 28, "direclty" should read -- directly --

Column 22,
Line 43, "Machintosh apple" should read -- Macintosh apple --

Column 24,
Line 52, "e.g," should read -- e.g., --

Column 25,
Line 38, "ee FIG. 11" should read -- see FIG. 11 --

Column 32,
Line 21, "among two ore more" should read -- among two or more --
Lines 50-51, "Normal decompositon, Free decompisiton" should read
-- Normal decomposition, Free decomposition --

UNITED STATES PATENT AND TRADEMARK OFFICE
CERTIFICATE OF CORRECTION

PATENT NO.    : 6,847,980 B1
DATED         : January 25, 2002
INVENTOR(S)   : Ana B. Benitez et al.

It is certified that error appears in the above-identified patent and that said Letters Patent is hereby corrected as shown below:

Column 35,
Line 14, "comprising the step of" should read -- comprising the step of --

Signed and Sealed this

Twenty-first Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,847,980 B1  
APPLICATION NO. : 09/607974  
DATED : January 25, 2005  
INVENTOR(S) : Benitez et al.

Page 1 of 1

It is certified that error appears in the above-identified patent and that said Letters Patent is hereby corrected as shown below:

Column 1, line 9, please insert the following header and paragraph:

-- Statement Regarding Federally Sponsored Research or Development
This invention was made with government support under grant number 8811111 awarded by the National Science Foundation. The government has certain rights in the invention. --

Signed and Sealed this

Thirteenth Day of May, 2008

JON W. DUDAS  
*Director of the United States Patent and Trademark Office*